United States Patent
Kim et al.

(10) Patent No.: US 10,641,546 B2
(45) Date of Patent: May 5, 2020

(54) REFRIGERATOR

(71) Applicant: LG ELECTRONICS INC., Seoul (KR)

(72) Inventors: Sangoh Kim, Seoul (KR); Hangbok Lee, Seoul (KR); Jaeyoul Lee, Seoul (KR); Minsub Kim, Seoul (KR); Jungkyu Son, Seoul (KR); Jaehyun Soh, Seoul (KR); Eugene Suh, Seoul (KR); Nami Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/433,697

(22) Filed: Jun. 6, 2019

(65) Prior Publication Data

US 2019/0285337 A1 Sep. 19, 2019

Related U.S. Application Data

(60) Division of application No. 15/928,553, filed on Mar. 22, 2018, now Pat. No. 10,345,035, which is a
(Continued)

(30) Foreign Application Priority Data

Oct. 17, 2014 (KR) ........................ 10-2014-0140936
Dec. 16, 2014 (KR) ........................ 10-2014-0181403
Jun. 22, 2015 (KR) ........................ 10-2015-0088477

(51) Int. Cl.
*F25D 27/00* (2006.01)
*F25D 23/02* (2006.01)
(Continued)

(52) U.S. Cl.
CPC .......... *F25D 27/005* (2013.01); *A47F 3/0434* (2013.01); *A47L 15/4257* (2013.01);
(Continued)

(58) Field of Classification Search
CPC .... F25D 27/005; A47L 15/4257; D06F 39/14; D06F 49/003
See application file for complete search history.

(56) References Cited

U.S. PATENT DOCUMENTS

| 6,059,420 A | 5/2000 | Rogers |
| 2005/0151620 A1 | 7/2005 | Neumann |

(Continued)

FOREIGN PATENT DOCUMENTS

| CN | 102472555 | 5/2012 |
| CN | 102519204 | 6/2012 |

(Continued)

OTHER PUBLICATIONS

U.S. Notice of Allowance in U.S. Appl. No. 16/119,107 dated Oct. 11, 2018, 16 pages.
(Continued)

*Primary Examiner* — Evan P Dzierzynski
(74) *Attorney, Agent, or Firm* — KED & Associates LLP

(57) ABSTRACT

A refrigerator equipped with a door that becomes transparent as necessary to make the interior thereof visible is disclosed. The refrigerator includes a cabinet having a storage compartment defined therein, a lighting device for illuminating the interior of the storage compartment, a door, which is hingedly coupled to the cabinet to open and close the storage compartment, and has an opening and a panel assembly including a front panel disposed on the front surface thereof, a sensor for detecting sound waves, which are generated by a knock input applied to the door and are transmitted through the front panel, and a controller for controlling the lighting device to allow light to be transmitted through the panel assembly, thus making the storage compartment visible from outside the door through the opening when a predetermined knock input is detected.

22 Claims, 19 Drawing Sheets

Related U.S. Application Data continuation of application No. 15/306,862, filed as application No. PCT/KR2015/011029 on Oct. 19, 2015, now Pat. No. 10,274,250.

(51) Int. Cl.
| | |
|---|---|
| G01H 1/00 | (2006.01) |
| G01H 3/00 | (2006.01) |
| A47F 3/04 | (2006.01) |
| F25D 11/00 | (2006.01) |
| F25D 29/00 | (2006.01) |
| G01D 5/02 | (2006.01) |
| A47L 15/42 | (2006.01) |
| D06F 39/14 | (2006.01) |
| D06F 49/00 | (2006.01) |
| F24C 15/04 | (2006.01) |

(52) U.S. Cl.
CPC ............ *D06F 39/14* (2013.01); *D06F 49/003* (2013.01); *F24C 15/04* (2013.01); *F25D 11/00* (2013.01); *F25D 23/025* (2013.01); *F25D 23/028* (2013.01); *F25D 29/005* (2013.01); *G01D 5/02* (2013.01); *G01H 1/00* (2013.01); *G01H 3/00* (2013.01); *F25D 2323/02* (2013.01); *F25D 2323/021* (2013.01); *F25D 2323/023* (2013.01); *F25D 2700/04* (2013.01)

(56) References Cited

U.S. PATENT DOCUMENTS

| | | | | |
|---|---|---|---|---|
| 2008/0186696 | A1* | 8/2008 | Awai | .................... F25D 27/005 362/92 |
| 2011/0016910 | A1 | 1/2011 | Bak | |
| 2012/0259265 | A1 | 10/2012 | Salehi | |
| 2014/0111333 | A1 | 4/2014 | Haas | |
| 2016/0047743 | A1 | 2/2016 | Blei | |
| 2018/0363966 | A1* | 12/2018 | Hottenroth | ............ F25D 27/005 |

FOREIGN PATENT DOCUMENTS

| | | |
|---|---|---|
| CN | 202734419 | 2/2013 |
| CN | 103426405 | 12/2013 |
| CN | 203771885 | 8/2014 |
| JP | 2002-031471 | 1/2002 |
| KR | 10-2007-0033131 | 3/2007 |
| KR | 10-2010-0082759 | 7/2010 |
| KR | 10-2013-0027101 | 3/2013 |
| KR | 10-2013-0072186 | 7/2013 |
| WO | WO 2007/115587 | 10/2007 |

OTHER PUBLICATIONS

U.S. Office Action in U.S. Appl. No. 15/306,862 dated Feb. 21, 2018, 20 pages.

Chinese Office Action in Chinese Application No. 201580011367.6, dated Mar. 20, 2018, 18 pages.

Extended European Search Report in European Application No. 15850565.1, dated Jul. 12, 2017, 9 pages (with English translation).

Office Action issued in U.S. Appl. No. 15/662,469 dated Nov. 17, 2017, 21 page

Extended European Search Report dated Mar. 4, 2020 issued in Application 19207610.7.

\* cited by examiner

REFRIGERATOR

CROSS REFERENCE TO RELATED APPLICATIONS

This application is a Divisional of U.S. application Ser. No. 15/928,553, filed on Mar. 22, 2018, which is a continuation of U.S. application Ser. No. 15/306,862, filed on Oct. 26, 2016, which is a U.S. National Phase Application under 35 U.S.C. § 371 of International Application PCT/KR2015/011029, filed on Oct. 19, 2015, which claims the benefit of Korean Application No. 10-2014-0140936, filed on Oct. 17, 2014, Korean Application No. 10-2014-0181403, filed on Dec. 16, 2014, and Korean Application No. 10-2015-0088477, filed on Jun. 22, 2015, the entire contents of which are hereby incorporated by reference in their entireties.

TECHNICAL FIELD

The present invention relates to a refrigerator equipped with a door that becomes transparent as necessary to make the interior thereof visible, and more particularly, to a refrigerator equipped with a door that becomes transparent as necessary to make the interior thereof visible without having to open the door.

BACKGROUND ART

In general, refrigerators are apparatuses for keeping foods frozen or at a temperature slightly above freezing temperature by discharging cold air generated by a refrigeration cycle consisting of, for example, a compressor, a condenser, an expansion valve, and an evaporator to lower the temperature in a storage compartment thereof.

A typical refrigerator includes a freezing compartment, in which foods or beverages are kept frozen and a refrigerating compartment, in which foods or beverages are kept cold.

There are several kinds of refrigerators, including a top-mounting type refrigerator, in which a freezing compartment is located above a refrigerating compartment, a bottom-freezer type refrigerator, in which a freezing compartment is located below a refrigerating compartment, and a side-by-side type refrigerator, in which a freezing compartment and a refrigerating compartment are respectively located on left and right sides. The freezing compartment and the refrigerating compartment may be provided with respective doors, and may be accessed through the respective doors.

In addition to such refrigerators, which include a refrigerating compartment and a freezing compartment which are compartmentalized from each other, there is also a refrigerator which allows access to both the refrigerating compartment and the freezing compartment through a single door. This kind of refrigerator is mostly small-sized, and is typically constructed such that the freezing compartment is provided in a predetermined space within the refrigerating compartment.

Among the top-mounting refrigerators, there is also provided a French type refrigerator in which an upper refrigerating compartment is opened and closed by right and left doors. The freezing compartment of the French type refrigerator may also be opened and closed by right and left doors.

Recently, in addition to the original function of keeping foods refrigerated or frozen, the variety of functions provided by refrigerators is increasing. For example, a dispenser is installed to a door of the refrigerator to provide purified water and ice, and a display is installed on the front surface of the door to show the state of the refrigerator and to assist a user in controlling the refrigerator.

The door of a refrigerator is generally constructed to be opaque and to open and close the storage compartment of the refrigerator body. In other words, the door also serves as a thermal insulating wall that defines a refrigerating compartment or a freezing compartment. The difference resides in the fact that the door is a kind of thermal insulating wall that is capable of being opened and closed so as to allow a user to access to the refrigerating compartment or the freezing compartment. Accordingly, it is typical for a user not to know the type, location, etc. of objects stored in the storage compartment before opening the door.

A large amount of cold air is lost when the door of a refrigerator is opened. Accordingly, the loss of cold air accumulates as the door remains in the opened state.

Generally, objects having various shapes are stored in the refrigerating compartment of the freezing compartment. Accordingly, it typically takes a user a rather long time to find and take out a desired object. Specifically, a considerable time is required for the user to look all around the storage compartment and find a desired object in the state in which the door is opened.

That is, the inherent characteristics of the refrigerator inconvenience the user and lead to increased energy consumption.

In recent years, a refrigerator in which only part of a storage compartment is opened has been proposed. For example, a refrigerator which is provided with a sub door for opening and closing a sub storage compartment defined in a main door has been proposed. The sub storage compartment is a portion of the space of the main storage compartment, and is isolated from the main storage compartment by a partition wall. This kind of refrigerator may be referred to as a door-in-door (DID) refrigerator. This DID refrigerator is advantageous in that the outward leakage of cold air from the main storage compartment is considerably reduced when only the sub door is opened.

For example, stored objects, such as beverages, which are frequently taken out of and put back into the storage compartment, are stored in the sub storage compartment, and thus the sub storage compartment can be accessed by opening the sub door while maintaining the main door in the closed state.

There is also a home-bar refrigerator which is equipped with a home-bar door. The home-bar may be considered a very small sized sub storage compartment. Specifically, a small amount of beverages or the like may be stored in the home-bar, which is provided in the rear of the main door through a home-bar door mounted in a very small area of the main door.

A refrigerator in which the home-bar is further enlarged, compared to the home-bar refrigerator, may be referred to as the DID refrigerator.

However, the home-bar refrigerator and the DID refrigerator both have the same problem in that the volume of the sub storage compartment and the amount of objects stored in the sub storage compartment are increased. In other words, it takes a considerable time to open the sub door or the home-bar door and find an object to be taken out, which is inconvenient for the user and increases energy consumption.

DISCLOSURE

Technical Problem

Accordingly, the present invention has been made keeping in mind the above problems occurring in the prior art.

In an embodiment, the present invention intends to provide a refrigerator equipped with a door for opening and closing a storage compartment, which is at least partially transparent so as to make the interior of the storage compartment visible without having to open the door.

In an embodiment, the present invention intends to provide a refrigerator equipped with a see-through door which allows light to be transmitted therethrough, that is, a refrigerator equipped with a see-through door which allows the interior of a storage compartment behind the door to be visible through the door from the outside.

In an embodiment, the present invention intends to provide a refrigerator equipped with a door capable of being selectively converted into a see-through door, that is, a refrigerator equipped with a door that normally does not allow a storage compartment to be visible through the door, but only allows the storage compartment to be visible when required by a user.

In an embodiment, the present invention intends to provide a refrigerator which is constructed to enable a user to easily apply input for conversion into a see-through door and to reduce input error, recognition error, malfunctions, or the like, that is, a refrigerator capable of improving the recognition rate so as to correctly recognize user input.

In an embodiment, the present invention intends to provide a refrigerator capable of efficiently detecting a user's tapping, that is, a knock input for conversion into a see-through door, thus making it easy to use.

In an embodiment, the present invention intends to provide a refrigerator capable of efficiently detecting a user's tapping even if the position (knock input position) at which the user taps is spaced apart from the position (knock detecting position) at which the tapping is detected.

In an embodiment, the present invention intends to provide a refrigerator in which the area of a door on which a user taps is expanded to the entire front surface of the door by employing the transmission of sound wave through a medium.

In an embodiment, the present invention intends to provide a refrigerator which is able to efficiently detect a knock input and is simplified in structure by eliminating expensive devices such as touch panels.

In an embodiment, the present invention intends to provide a refrigerator which ensures reliable thermal insulation performance and stability and is easily fabricated.

In an embodiment, the present invention intends to provide a refrigerator equipped with a door which normally operates as an opaque door but serves as a see-through door by activating a lighting device when required by a user, thus reducing the energy consumption required for conversion into a see-through door.

In an embodiment, the present invention intends to provide a refrigerator in which the entire see-through area of a door is used as the knock input area and a sensor for detecting a knock input is mounted on an area other than a see-through area so as to prevent the sensor from interfering with the see-through area, thus providing an aesthetically pleasing appearance.

In an embodiment, the present invention intends to provide a refrigerator in which a sensor for detecting a knock input is mounted on and in close contact with a panel to which a knock input is applied so as to efficiently detect a knock input and to prevent false detection caused by disturbances. In particular, the present invention intends to provide a refrigerator which is able to maintain force sufficient to keep the sensor in close contact with the panel.

In an embodiment, the present invention intends to provide a refrigerator in which the sensor detects a sound wave caused by a knock input and is in close contact with the panel with a hermetical space therebetween, thereby efficiently detecting a knock input and preventing false detection caused by external noises.

In an embodiment, the present invention intends to provide a refrigerator which has a structure capable of causing a sensor for detecting user input for conversion into a see-through door to be continuously in close contact with a medium, thereby improving the durability and reliability of the action of the refrigerator relating to the see-through door.

In an embodiment, the present invention intends to provide a refrigerator having a door capable of being easily converted into a see-through door and ensuring reliable thermal insulation performance. Furthermore, the present invention intends to provide a refrigerator which is easy to manufacture.

In an embodiment, the present invention intends to provide a door having an aesthetically pleasing appearance and a refrigerator including the same.

In an embodiment, the present invention intends to provide a refrigerator which is capable of preventing an aesthetically pleasing appearance from being deteriorated due to input unit for allowing input for conversion into a see-through door and a detection unit for detecting such input.

Technical Solution

The object of the present invention can be achieved by providing a refrigerator including a cabinet having a storage compartment defined therein, a lighting device for illuminating the interior of the storage compartment, a door, which is hingedly coupled to the cabinet to open and close the storage compartment and has an opening and a panel assembly including a front panel disposed on the front surface thereof, a sensor for detecting sound waves, which are generated by the application of a knock input to the door and are transmitted through the front panel, and a controller for controlling the lighting device to allow light to be transmitted through the panel assembly, thus making the storage compartment visible from outside the door through the opening when a predetermined knock input is detected.

The controller may activate the lighting device when it is determined by detection by the sensor that two or more user knock inputs are applied within an interval corresponding to a predetermined period of time. The activation of the lighting device enables the door to be converted into a see-through door.

The controller may activate the lighting device to cause the storage compartment to be gradually brightened when the lighting device is activated. The controller may deactivate the lighting device after the lapse of a predetermined time since the lighting device was activated.

The controller may deactivate the lighting device when the sensor detects that a user taps on the door after the lighting device has already been activated.

When the knock inputs are continuously repeated, the controller may sequentially determine whether two continuous knock inputs are knock on inputs, and extends the activation time of the lighting device when it is determined that the two continuous knock inputs are knock on inputs.

When the knock inputs are continuously repeated, the controller may alternately determine that the continuous knock inputs are knock on inputs or knock off inputs for deactivating the lighting device, and may control the lighting device to be repeatedly turned on and off.

When the knock inputs are continuously repeated, the controller may ignore subsequent knock on input while the lighting device is activated.

The sensor may include a sensor device and a sensor device receptor for accommodating the sensor device. Specifically, the sensor may include a sensor device for detecting input for conversion into a see-through door by a user and a sensor device receptor for mounting the sensor device on the front panel. In other words, the sensor device may not be mounted on the front panel directly, but may be mounted on the front panel via the sensor device receptor. The sensor device and the sensor device receptor may collectively be referred to as a sensor device module.

The sensor device may be a microphone for detecting sound waves. Accordingly, the sensor device receptor may be referred to as a microphone receptor, and the sensor device module may be referred to as a microphone module.

The sensor may include a modular microcomputer which is provided independently from the controller, and the modular microcomputer may determine whether a predetermined knock input is applied by detecting user input received through the microphone, that is, whether a normal user input is applied. The modular microcomputer may send the result of the determination to the controller.

When the sensor device is a microphone, the modular microcomputer may determine that a predetermined knock input is applied by detecting sound waves received through the microphone, and may send the result of the determination to the controller.

The sensor may include a filter for removing noise from a signal received at the microphone module, an amplifier for amplifying a signal output from the filter and outputting the signal to the modular microcomputer, and a PCB on which the filter, the amplifier and the modular microcomputer are mounted.

The sensor may include a support member for accommodating the microphone module and causing the microphone module to closely contact the front panel.

The support member may include a holder, which accommodates the sensor device module or the microphone module and which is biased to cause the sensor device module or the microphone module to closely contact the front panel.

The support member may include an elastic element for supporting the holder from the rear of the holder.

The panel assembly may include the front panel, which is made of a transparent material and defines the appearance of the front of the door, and a thermal insulation panel, which is disposed behind the front panel and is mounted at the opening, wherein the microphone module closely contacts the front surface or the rear surface of the front panel.

The door may include an inner frame having an opening and constituting a marginal portion of the door, and a door frame including a door liner, which is disposed behind the door frame and has an opening, the door liner constituting a marginal portion of the door.

The panel assembly may be coupled to the door frame from the front of the door frame.

The thermal insulation panel may be fitted in the opening in the inner frame, and the front panel may be configured to be larger than the thermal insulation panel so as to cover the opening in the inner frame.

The front panel may be attached to the front surface of the door frame.

The sensor device or the microphone module may be disposed in the area between the opening in the inner frame and the marginal portion of the front panel.

The door may include an upper cap decoration and a lower cap decoration, which are coupled to the upper portion and the lower portion of the door frame, respectively, and one of the upper and lower cap decorations may be provided with a through hole through which the microphone module passes, wherein the microphone module passes through the through hole and closely contacts the rear surface of the front panel.

The door may include an outer door having an opening and constituting a marginal portion of the door, a door liner disposed behind the outer door and having an opening, the door liner constituting the marginal portion of the door, and cap decorations respectively coupled to upper ends and lower ends of the outer door and the door liner.

The panel assembly may be disposed between the outer door and the door liner, and the outer door and the door liner may be coupled to each other such that the marginal portion is covered by the outer door.

The microphone module may be disposed behind the outer door so as to closely contact the front surface of the front panel.

In another aspect of the present invention, provided herein is a refrigerator including a cabinet having a storage compartment defined therein, a main door, which is hingedly coupled to the cabinet to open and close the storage compartment and has an opening therein, a sub storage compartment provided at the rear surface of the main door, a lighting device for illuminating the sub storage compartment, a sub door, which is hingedly coupled to the main door or the cabinet to open and close the sub storage compartment and includes a panel assembly including a front panel disposed at the front surface thereof, a microphone module for detecting input for conversion into a see-through door applied by a user, and a controller, which, when a predetermined input is detected, activates the lighting device such that light is transmitted through the panel assembly so as to make the sub storage compartment visible through the opening in the sub door from outside the sub door.

The sensor device module may be a microphone module for detecting input for conversion into a see-through door by a sound wave. The microphone module may include a microphone for detecting sound waves and a microphone receptor for accommodating the microphone. The microphone may detect sound waves transmitted through the front panel.

The input for conversion into a see-through door may be input whereby a user taps on the front panel, that is, a knock input. Accordingly, the microphone may detect sound waves transmitted through the front panel.

In still another aspect of the present invention, provided herein is a refrigerator including a cabinet having a storage compartment defined therein, a lighting device for illuminating the interior of the storage compartment, a door, which is hingedly coupled to the cabinet to open and close the storage compartment and has therein an opening and which includes a panel assembly including a front panel disposed on the front surface thereof, a sensor including a sensor device module disposed outside the opening in the radial direction to detect input, applied by a user, for conversion into a see-through door, and a controller, which, when a predetermined input is detected, activates the lighting device such that light is transmitted through the panel assembly so as to make the storage compartment visible through the opening in the door from outside the door, wherein the refrigerator further includes a support member for supporting the sensor device module so as to cause the sensor device module to closely contact the front panel and to define a hermetical space between the support member and the front panel to block external noise.

The sensor device module may include a sensor device, and a sensor device receptor, which accommodates the sensor device, closely contacts the front panel, and has a hermetical space therein.

The support member may include a holder, which accommodates the sensor device module and is biased to cause the sensor device module to closely contact the front panel.

The sensor device module may include a signal line extending outward from the sensor device, and the holder may have a slot in which the signal line is fitted such that the signal line extends outward from the holder.

The door may include a door frame, which has an opening and is coupled to the panel assembly, and the door frame may have a through hole, through which the holder passes and which closely contact the front panel radially outside the opening.

A holder mount on which the holder is mounted may be provided behind the through hole.

In yet another aspect of the present invention, provided herein is a refrigerator including a cabinet having a storage compartment defined therein, a lighting device for illuminating the interior of the storage compartment, a door, which is hingedly coupled to the cabinet to open and close the storage compartment and has an opening and which includes a panel assembly including a front panel disposed at the front surface thereof, a sensor for detecting a knock input applied to the front panel, and a controller, which, when a predetermined knock input is detected, activates the lighting device such that light is transmitted through the panel assembly so as to make the storage compartment visible through the opening in the door from outside the door, wherein the sensor includes a microphone module for detecting sound waves, which are generated by a knock input of a user and are transmitted through the front panel, and the microphone module closely contacts the front panel radially outside the opening so as to prevent the microphone module from interfering with transmission of light through the opening.

The door may include a door frame, which has an opening and is coupled to the panel assembly, and the front face of the microphone module may be covered by the door frame in order to prevent the microphone module from being visibly exposed to the outside from the front surface of the door.

The door may include a door frame, which has an opening and is coupled to the panel assembly, and the front face of microphone module may be covered by the door frame, which is opaque when light is not transmitted therethrough so as to prevent the microphone module from being visibly exposed to the outside from the front surface of the door.

In still another aspect of the present invention, provided herein is a refrigerator including a cabinet having a storage compartment defined therein, a lighting device for illuminating the interior of the storage compartment, a door, which is hingedly coupled to the cabinet to open and close the storage compartment, has an opening therein, and includes a panel assembly including a front panel disposed on the front surface thereof, a sensor for detecting input for, transmitted through the front panel by a user, for conversion into a see-through door, and a controller, which, when a predetermined input is detected, activates the lighting device such that light is transmitted through the panel assembly so as to make the storage compartment visible through the opening in the door from outside the door, wherein the sensor includes the sensor device module, which is disposed radially outside the opening and closely contacts the front panel.

The panel assembly may include a thermal insulation glass panel, which is spaced rearward apart from the front panel and is mounted at the opening so as to define a hermetical thermal insulation space between the thermal insulation glass panel and the front panel, and the sensor device module may be positioned radially outside the hermetical thermal insulation space and may be spaced apart from the thermal insulation glass panel.

In a further aspect of the present invention, provided herein is a refrigerator including a cabinet having a storage compartment defined therein, a lighting device for illuminating an interior of the storage compartment, a door, which is hingedly coupled to the cabinet to open and close the storage compartment and which has an opening therein, a panel assembly disposed on the door and selectively becoming transparent, and a controller for controlling the lighting device to cause the panel assembly to become transparent, thus making the storage compartment visible from outside the door through the opening. Accordingly, the panel assembly may be selectively converted into the transparent panel, that is, the see-through door, by the control of the controller.

The panel assembly may cover the opening. That is, the panel assembly may have a larger area than the opening. Both the panel assembly and the opening may be configured to have substantially rectangular shapes. Accordingly, the central area of the panel assembly may correspond to the opening, and the marginal portion of the panel assembly may extend outward beyond the opening.

The central area of the panel assembly, that is, the area corresponding to the opening, may be considered to be a see-through area. The interior of the storage compartment may be visible from the outside through the see-through area.

The panel assembly may constitute the door. Accordingly, it is critical to ensure thermal insulation by the panel assembly. Accordingly, the panel assembly may include a front panel provided at the front surface of the door and a thermal insulation glass panel, which is spaced rearward apart from the front panel so as to define a hermetical thermal insulation space between the thermal insulation glass panel and the front panel. The thermal insulation glass panel may have further improved thermal insulation performance by virtue of the hermetical thermal insulation space between the thermal insulation glass panel and the front panel, in addition to its inherent thermal insulation characteristics. The hermetical space may be a vacuum space, or may be a space filled with inert gas, such as argon, that has better thermal insulation characteristics than air.

The sensor may be positioned outside the hermetical thermal insulation space in a radial direction and may be spaced apart from the thermal insulation glass panel. That is, the sensor may be positioned outside the hermetical thermal insulation space. Accordingly, it is possible to fundamentally prevent a decrease in thermal insulation performance, and it is possible to easily mount the sensor after the creation of the hermetical thermal insulation space. In other words, since the sensor may be mounted on the front panel in a close-contact manner after fabrication of the panel assembly, it makes it easy to fabricate a door.

The thermal insulation glass panel may be constituted by a plurality of glass panels, and a thermal insulation space may be defined between the plurality of glass panels.

The front panel may also be made of a glass material. Accordingly, light can be transmitted through the panel assembly by conversion into a see-through door, thereby enabling the interior of the storage compartment to be visible by a user.

The front panel may be considered to be a component part that is exposed from the front surface of the door. The front panel may also be considered to be the component part to which input for conversion into a see-through door is applied. That is, it is possible to construct input unit having a relatively large area. For example, the input unit can have an area extending over substantially the entire front surface of the door, rather than having a very small area, as in a button. Accordingly, it is possible to realize input unit which extends over substantially the entire front surface of the door.

Since the conversion into a see-through door can be implemented by detecting sound waves transmitted through the inside of the front panel, the input unit, which is pulled or pressed for the purpose of conversion into a see-through door, may be obviated. Accordingly, the seal at the marginal region of the input unit (i.e. the front panel) may be efficiently maintained.

The door may include a door frame, which has therein an opening and constitutes the marginal portion of the door. The door frame may include the front door frame and the door line. The door liner may be positioned behind the door frame, particularly the front door frame. The door liner may also have an opening, and may constitute the marginal portion of the door.

The panel assembly may be coupled to the front of the door frame. The thermal insulation panel may be fitted in the opening in the door frame, and the front panel may be configured to be larger than the thermal insulation panel so as to cover the opening in the door frame. The front panel may be attached to the front surface of the door frame.

The door may include an upper cap decoration and a lower cap decoration, which are coupled to the door frame at an upper portion and a lower portion thereof, respectively.

Accordingly, the front panel may define the overall appearance of the front surface of the door.

The door may include an outer door having an opening and constituting a marginal portion of the door, a door liner disposed behind the outer door and having an opening therein, the door liner constituting the marginal portion of the door, and cap decorations respectively coupled to upper ends and lower ends of the outer door and the door liner.

The panel assembly may be disposed between the outer door and the door liner, and the outer door and the door liner may be coupled to each other such that the marginal portion is covered by the outer door.

Accordingly, the appearance of the entire front surface of the door may be defined by the outer door which is the marginal portion of the door and the front panel which is the central portion of the door.

Advantageous Effects

According to an embodiment of the present invention, there is provided a refrigerator equipped with a door for opening and closing a storage compartment, which is at least partially transparent so as to make the interior of the storage compartment visible without having to open the door.

According to an embodiment of the present invention, there is provided a refrigerator equipped with a see-through door which allows light to be transmitted therethrough, that is, a refrigerator equipped with a see-through door which allows the interior of a storage compartment behind the door to be visible through the door from the outside.

According to an embodiment of the present invention, there is provided a refrigerator equipped with a door capable of being selectively converted into a see-through door, that is, a refrigerator equipped with a door that normally does not allow a storage compartment to be visible through the door, but only allows the storage compartment to be visible when required by a user.

According to an embodiment of the present invention, there is provided a refrigerator which is constructed to enable a user to easily apply input for conversion into a see-through door and to reduce input error, recognition error, malfunctions, or the like, that is, a refrigerator capable of improving the recognition rate so as to correctly recognize user input.

According to an embodiment of the present invention, there is provided a refrigerator capable of efficiently detecting a user's tapping, that is, a knock input for conversion into a see-through door, thus making it easy to use.

According to an embodiment of the present invention, there is provided a refrigerator capable of efficiently detecting a user's tapping even if the position (knock input position) at which the user taps is spaced apart from the position (knock detecting position) at which the tapping is detected.

According to an embodiment of the present invention, there is provided a refrigerator in which the area of a door on which a user taps is expanded to the entire front surface of the door by employing the transmission of sound waves through a medium.

According to an embodiment of the present invention, there is provided a refrigerator which is able to efficiently detect a knock input and is simplified in structure by eliminating expensive devices such as touch panels.

According to an embodiment of the present invention, there is provided a refrigerator which ensures reliable thermal insulation performance and stability and is easily fabricated.

According to an embodiment of the present invention, there is provided a refrigerator equipped with a door which normally operates as an opaque door but serves as a see-through door by activating a lighting device when required by a user, thus reducing the energy consumption required for conversion into a see-through door.

According to an embodiment of the present invention, there is provided a refrigerator in which the entire see-through area of a door is used as the knock input area and a sensor for detecting a knock input is mounted on an area other than a see-through area so as to prevent the sensor from interfering with the see-through area, thus providing an aesthetically pleasing appearance.

According to an embodiment of the present invention, there is provided a refrigerator in which a sensor for detecting a knock input is mounted on and in closed contact with a panel to which a knock input is applied so as to efficiently detect a knock input and prevent false detection caused by disturbances. In particular, there is provided a refrigerator which is able to maintain the force that keeps the sensor in close contact with the panel.

According to an embodiment of the present invention, there is provided a refrigerator in which the sensor detects a sound wave caused by a knock input and is in close contact with the panel with a hermetical space therebetween, thereby efficiently detecting a knock input and preventing false detection caused by external noises.

According to an embodiment of the present invention, there is provided a refrigerator which has a structure capable of keeping a sensor, for detecting user input for conversion into a see-through door, in continuous close contact with a medium, thereby improving the durability and reliability of the action of the refrigerator relating to the see-through door.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
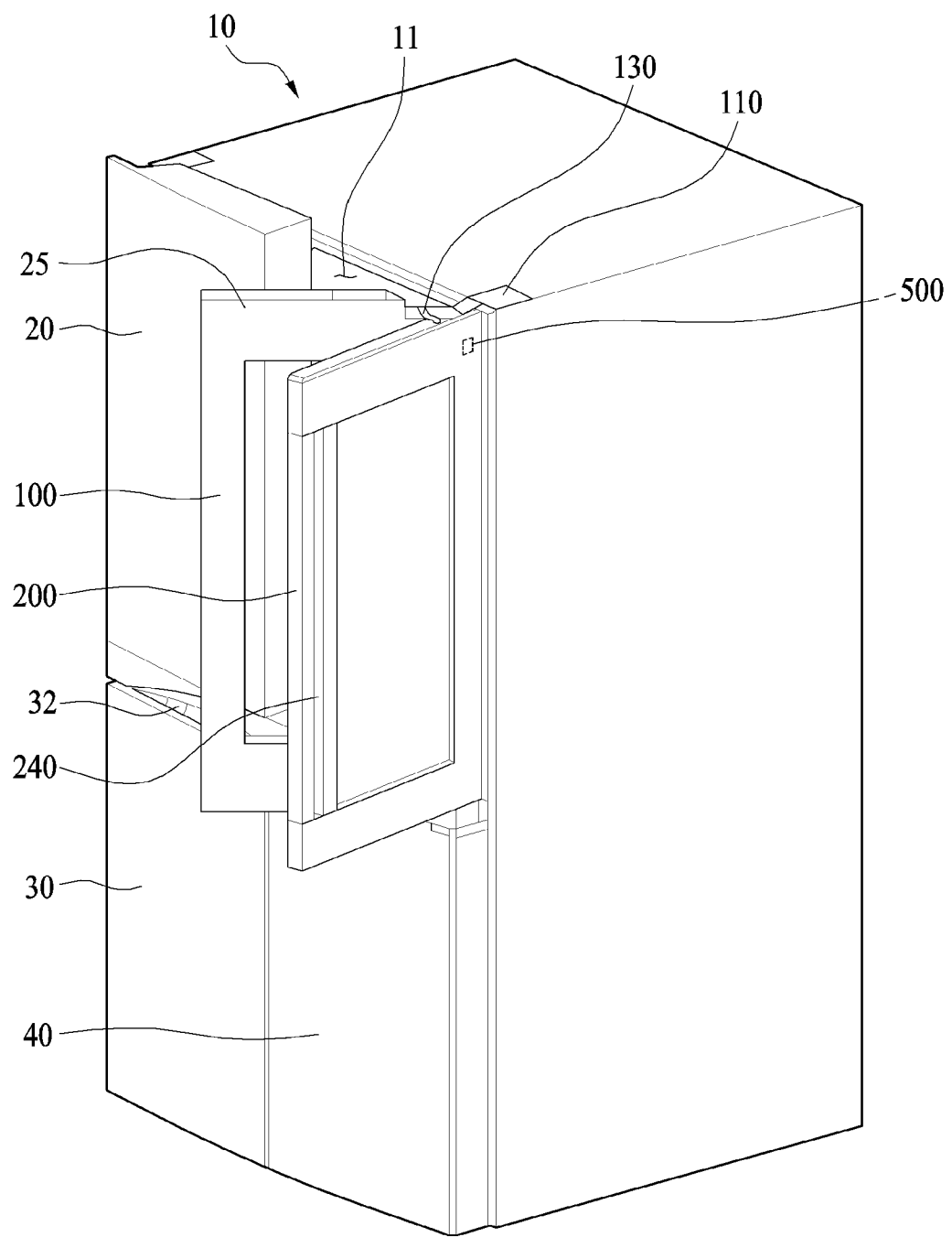
FIG. 1 is a perspective view showing a refrigerator according to a first embodiment of the present invention.

Reference will now be made in detail to the preferred embodiments of the present invention, examples of which are illustrated in the accompanying drawings.

The embodiments of the present invention are not limited to the above-mentioned type refrigerators. In other words, a main door adapted to open and close a refrigerating compartment or a freezing compartment may be a see-through door, or a sub door adapted to open and close a sub storage compartment or a home-bar door may be a see-through door. Since a home-bar door is also hingedly coupled to the main door, such a home-bar door may be alternatively referred to as a sub door.

FIGS. 1 to 4 are views showing a refrigerator according to a first embodiment of the present invention. The refrigerator shown in the drawings is a bottom-freezer type refrigerator in which a refrigerating compartment is provided at an upper position of a cabinet 10 and a freezing compartment is provided at a lower position of the cabinet 10. The refrigerating compartment or the freezing compartment may be considered part of the storage compartment or the main storage compartment 11 defined in the cabinet 10.

As described above, the present invention is not limited to this type of refrigerator. The present invention may be applied to any type of refrigerator as long as the refrigerator includes a door for opening and closing the storage compartment.

In the embodiment shown in the drawings, a left refrigerating compartment door 20 and a right refrigerating compartment door 25, which serve as doors for opening and closing the refrigerating compartment, are hingedly coupled to the left side and the right side of the cabinet 10. Alternatively, a single refrigerating compartment door may be hingedly coupled to the cabinet 10.

The left refrigerating compartment door 20 is an opaque door including a handle groove provided at the lower end thereof. In contrast, the right refrigerating compartment door 25 selectively becomes transparent such that a user can see the interior through the door 25. In other words, the right refrigerating compartment door 25 may be embodied as a see-through door.

Freezing compartment doors, which are provided under the refrigerating compartment door, may also include a left freezing compartment door 30 and a right freezing compartment door 40, which are hingedly coupled to respective sides of the lower portion of the front surface of the cabinet 10. Alternatively, a single freezing compartment door may be hingedly coupled to the cabinet 10, or a drawer type door may be mounted in the cabinet 10 so as to be pulled forward from the cabinet 10 and pushed rearward into the cabinet 10.

The left freezing compartment door 30 may be provided at the upper surface thereof with a handle groove 32, and the right freezing compartment door 40 may also be provided at the upper surface thereof with a handle groove.

Referring to FIG. 1, an embodiment in which some of the doors are embodied as see-through doors is shown. However, any door, which can be provided at a refrigerator, may be embodied as a see-through door, regardless of whether it opens and closes a refrigerating compartment or a freezing compartment, and regardless of whether it opens and closes a main storage compartment or a sub storage compartment.

As shown in FIG. 1, the right refrigerating compartment door 25 may include a main door 100, hingedly coupled to one side of the cabinet 10 by means of a main door hinge 110, and a sub door 200, hingedly coupled to the main door 100 or the cabinet 10 by means of a sub door hinge 100. In other words, the refrigerating compartment may be accessed by opening both the main door 100 and the sub door 200.

The main door 100 may be provided at the center with an opening, and may be provided at the back surface thereof with a sub storage compartment (not shown).

Accordingly, when the sub door 200 is opened, the sub storage compartment may be accessed through the opening in the main door 100. In other words, a user can access the sub storage compartment by opening only the sub door 200 without having to open the main door 100.

The sub storage compartment may be defined by a plurality of baskets (not shown) installed at different levels. Specifically, a cover (not shown) adapted to surround the plurality of baskets may be provided. The cover may serve as a partition wall for isolating the sub storage compartment and the main storage compartment from each other. Accordingly, the sub storage compartment may be positioned in front of the main storage compartment.

Figure 2:
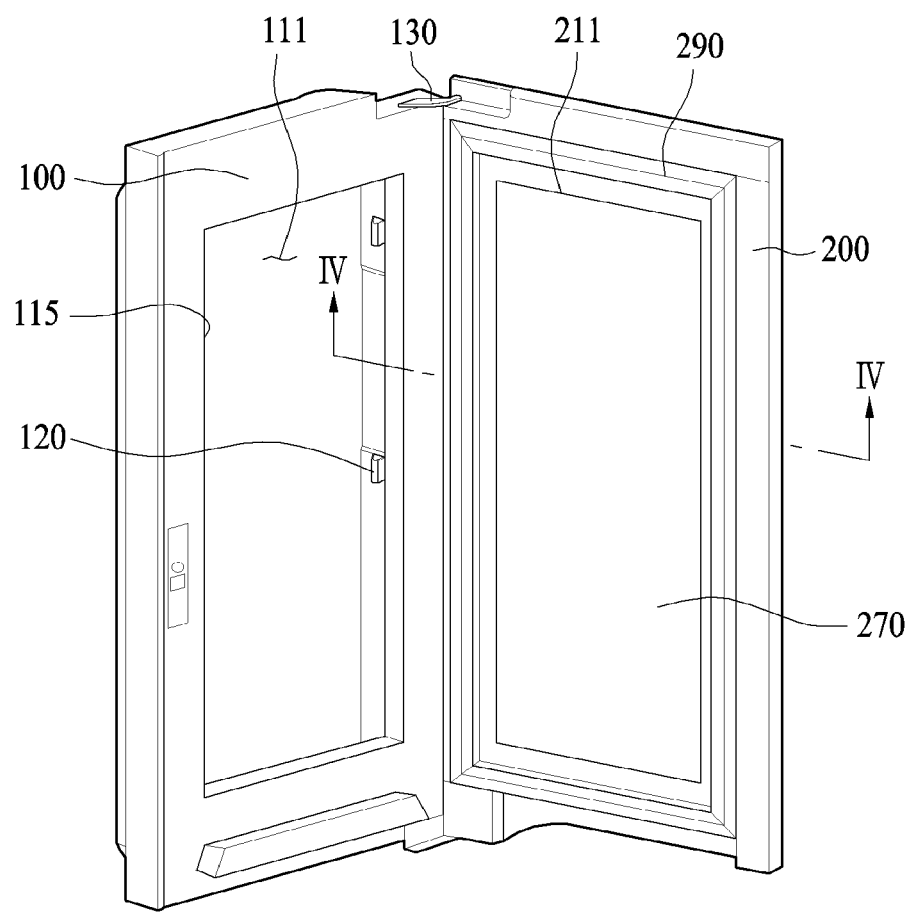
FIG. 2 is a perspective view showing the right door of the refrigerating compartment shown in FIG. 1, which is removed from the refrigerator.

As shown in FIG. 2, a plurality of mounting protrusions 120 for mounting a plurality of baskets (not shown) may be provided at rear regions of the inner surfaces of the opening 115 in the main door 100. The plurality of baskets may be two or three baskets, which are vertically spaced apart from each other by predetermined distances. Accordingly, a user can access the sub storage compartment by opening the sub door 200 while leaving the main door 100 closed. When the sub door 200 is opened together with the main door 100, the sub storage compartment 111 is, of course, rotated together with the main door 100. Therefore, a user can access the main storage compartment provided behind the sub storage compartment 111.

Since the relationship between the main door and the sub door and the relationship between the main storage compartment and the sub storage compartment are common in a DID refrigerator, descriptions thereof are omitted.

The sub door 200 is internally provided with a panel assembly 270 that selectively becomes transparent. Although the panel assembly may be constituted by a single panel, the panel assembly is preferably constituted by a plurality of panels. The panel assembly 270 may be selectively changed into a see-through panel assembly, and, as such, a user can see the internal space behind the door through the panel assembly 270.

When the main door 100 and the sub door 200 are integrally formed into a single door, unlike the construction shown in the drawings, a user can see the main storage compartment through the panel assembly 270. In this case, the main door 100 may be just the cabinet 10, and the sub door 200 may be considered the door for opening and closing the storage compartment. In other words, the opening formed in the main door 100 may be considered to be an opening formed in the cabinet 10.

As shown in FIG. 1, the sub door 200 may be provided with a groove-shaped handle 240 formed at the left side of the panel assembly 270. The handle 240 may be vertically elongated and may be the same length as the panel assembly 270. The sub door 200 may, of course, be the left sub door provided at the left side of the cabinet 10. In this case, the handle 240 may be positioned at the opposite side.

The sub door 200 may be rotated in the same direction as the main door 100. Specifically, the main door 100 and the sub door 200 may be rotated about a vertical rotating shaft, as shown in FIG. 2. However, the sub door 200 may be configured to be rotated about a horizontal rotating shaft like a home-bar.

Generally, the cabinet of the refrigerator is provided at the front surface thereof with a door switch (not shown) for detecting opening in the door, and the storage compartment is provided therein with a lighting device (not shown) for illuminating the interior of the storage compartment when the door is opened.

According to the embodiment of the present invention, the door is preferably changed into a see-through door by activation of the lighting device. Specifically, the door is preferably changed into a see-through door by the lighting device provided in the main storage compartment and/or the sub storage compartment such that the interior of the storage compartment becomes visible from the outside.

More specifically, it is preferable that the interior of the storage compartment become invisible upon deactivation of the lighting device and become visible upon activation of the lighting device. The interior of a room is not made clearly visible through a window glass by a bright outside. However, when the interior of the room is illuminated with a bright light, the interior of the room is clearly visible through the window glass. The see-through door utilizes this principle. The conversion of the see-through door is preferably performed by input of a user's command. Specifically, the door is preferably changed into a see-through door when a specific command is input to the refrigerator by a user.

The control process and control architecture associated with the conversion of the see-through door will be described later.

The specific construction of the sub door 200 is described with reference to FIGS. 3 and 4. As described above, the sub door 200 may be simply the main door for opening and closing the storage compartment. As shown in FIG. 1, if the sub door is hingedly coupled to the main door or the cabinet, the sub door 200 may be superimposed on the main door 100. In other words, the entire area of the sub door 200 may overlap the entire area of the main door 100. At this point, the entire area of the main door 100 is covered by the entire area of the sub door 200. Accordingly, since the main door 100 is shielded by the sub door 200, the sub door 200 defines the appearance of the front face of the refrigerator.

The sub door 200 includes a door frame 205 having a central opening 211. The door frame 205 constitutes the peripheral portion or the marginal portion of the sub door 200. In other words, the door frame 205 constitutes upper and lower marginal portions and both lateral side marginal portions of the sub door 200.

Specifically, the door frame 205 may include an outer door 210 constituting the marginal portion of the front face of the door and a door liner 280 constituting the marginal portion of the rear face of the door. The outer door 210 and the door liner 280 may also be provided with respective openings corresponding to the opening 211.

The door frame 205 may include cap decorations 260, which are respectively coupled to the upper ends and lower ends of the outer door 210 and the door liner 280. The outer door 210, the door liner 280 and the cap decorations 260 may constitute a door having a predetermined thickness and an internal space.

In conventional refrigerators, the internal space defined between the outer door 210, the door liner 280 and the cap decorations 260 is typically filled with foamed material for thermal insulation. The door according to the embodiment, particularly the sub door 200, preferably further includes the panel assembly 270 in addition to the door frame 205. Preferably, further provided is a panel assembly 270 adapted to be converted into a see-through door. As described hereinafter, the panel assembly 270 is preferably constructed to have a thermal insulation function.

The panel assembly 270 is preferably provided at the central portion of the sub door 200. Particularly, the panel assembly 270 is preferably configured to correspond to the opening in the door frame 205.

In order to mount the panel assembly 270, the door frame 205 may further include an inner frame 230 interposed between the outer door 210 and the door liner 280. The inner frame 230 may also be provided at the center area thereof with an opening corresponding to the opening 211 in the door frame 205.

The door frame 205 may further include a door decoration 220. The door decoration 220 may be mounted on the peripheral area of the opening in the door frame 205 so as to substantially define the opening 211 in the door frame 205.

The sub door 200 may further include an upper hinge bracket 254 and a lower hinge bracket 256 in addition to the panel assembly 270 so as to make the sub door 200 rotatable. The sub door 200 may include a handle 240, which enables a user to open and close the sub door 200 while grasping the sub door 200. The sub door 200 may further include a support 250.

Hereinafter, the process of assembling the sub door 200 will be described with reference to FIG. 4.

The outer door 210 is first assembled with the door decoration 220, and the handle 240 is then coupled to the assembly. A handle support 245 may be interposed between the handle 240 and the outer door 210 or the door decoration 220. The handle support 245 may be constituted by a metal rod so as to reinforce the rigidity of the handle 240. The door decoration 220 may be coupled to the rear surface of the outer door 210. In the embodiment, the handle 240 may be coupled to the left end of the outer door 210 when viewed in FIG. 4.

Subsequently, the inner frame 230 is assembled with the rear surface of the outer door 210, and the supports 250 are assembled with the hinge brackets 254 and 256.

The supports 250 are provided at upper and lower ends of the panel assembly 270, and the supports 250 may be provided to correspond to the four corners of the opening 211. The supports 250 are provided to correspond to the four corners of the panel assembly 270 so as to protect the panel assembly 270. In other words, the supports 250 support the panel assembly 270 such that the weight of the panel assembly 270 is uniformly distributed to the door frame 205.

The supports 250 are assembled with the hinge brackets 254 and 256. Accordingly, the supports 250 further serve to reinforce the strength of the hinge regions.

Thereafter, the cap decorations 260 are coupled to the outer door 210 from the rear. The cap decorations 260 may be coupled to the outer door 210 by being respectively fitted on the upper and lower ends of the outer door 210.

Subsequently, the panel assembly 270 may be coupled to the outer door 210 from the rear, and the door liner 280 may be coupled to the outer door 210 from the rear. Specifically, the door liner 280 may be securely coupled to the outer door 210 by means of screws.

Finally, a gasket 290 is mounted on the rear surface of the door liner 280, thus completing the assembly of the sub door 200.

The upper hinge bracket 254 and the lower hinge bracket 256 may be provided with respective sub door hinges 130 coupled thereto. When the sub door 200 is closed with respect to the main door 100, the gasket 290 serves to seal the clearance therebetween, thus preventing the leakage of cold air through the clearance.

Figure 3:
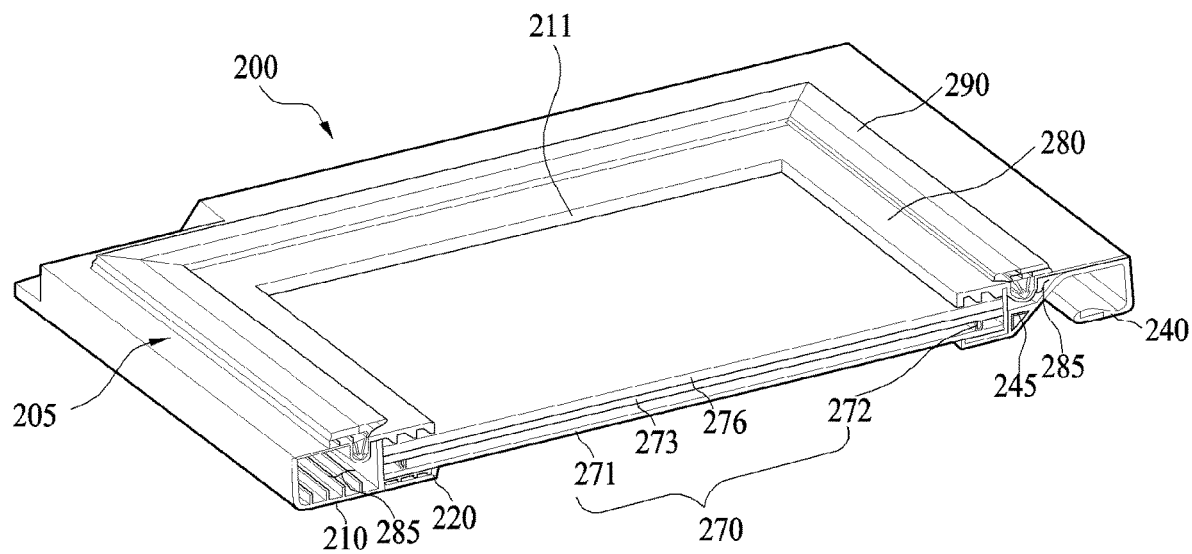
FIG. 3 is a perspective view of the right door, which is cut away along line IV-IV of FIG. 2.

As shown in FIG. 3, the panel assembly 270 may include a front panel 271, which is exposed from the front surface of the sub door 200. The front panel 271 may be made of a transparent material, and its rear surface may have a metal vapor-deposited thereon. The deposited metal layer may function to make the front panel 271 opaque when light is not transmitted therethrough and make the front panel 271 transparent when light is transmitted therethrough.

Of course, the front panel 271 may include a color coating film, or may be constituted by a color panel. Specifically, although the front panel 271 is opaque under low-intensity light conditions, the front panel 271 may become transparent under relatively high-intensity light conditions.

This means that the front panel 271 is opaque when the lighting device behind the front panel 271 is deactivated, and is converted into a transparent panel, that is, a see-through door, when the lighting device is activated. Accordingly, although the interior of the storage compartment becomes invisible when the interior is dark, the interior of the storage compartment becomes visible through the front panel 271 when the interior is bright.

The panel assembly 270 may include a thermal insulation panel provided behind the front panel 271. The thermal insulation panel may include a plurality of thermal insulation panels. FIG. 3 shows an example in which two thermal insulation panels 273 and 276 are provided. A spacer rod 272 may be disposed between the front panel 271 and the thermal insulation panel 273.

The front panel 271, which is made of a transparent material, is mounted at the central opening in the sub door 200 so as to constitute the front surface of the sub door 200.

The internal space defined in the door frame 205 of the sub door 200 excluding the panel assembly 270 is preferably filled with a thermal insulation material. Specifically, the space between the outer door 210 and the door liner 280, that is, the space 285 provided at the marginal portion of the sub door 200, may be filled with a thermal insulation material so as to prevent cold air from leaking between the gasket 290 and the panel assembly 270.

Accordingly, the marginal portion of the sub door 200 is thermally insulated by the thermal insulation material, for example, polyurethane, and the central portion of the sub door 200 is thermally insulated by the thermal insulation panels 273 and 276.

The space 285 is filled with the foamed material after the sub door 200 is completely assembled, thus implementing secure coupling between the outer door 210 and the door liner 280.

The structure and the process of fabricating the panel assembly 270 will be described in detail later.

FIGS. 5 to 8 are views showing a refrigerator according to a second embodiment of the present invention.

Figure 5:
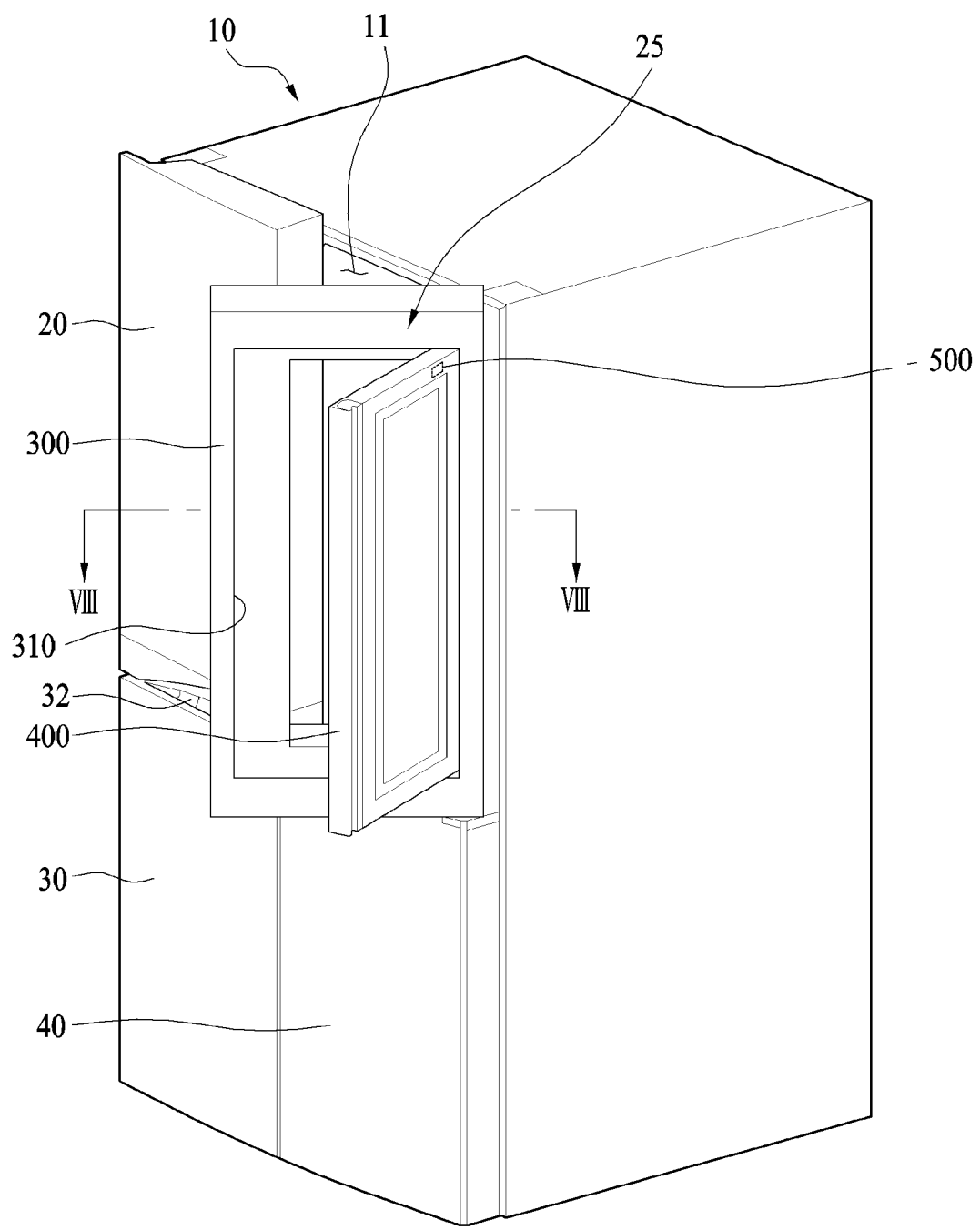
FIG. 5 is a perspective view showing a refrigerator according to a second embodiment of the present invention.
Figure 6:
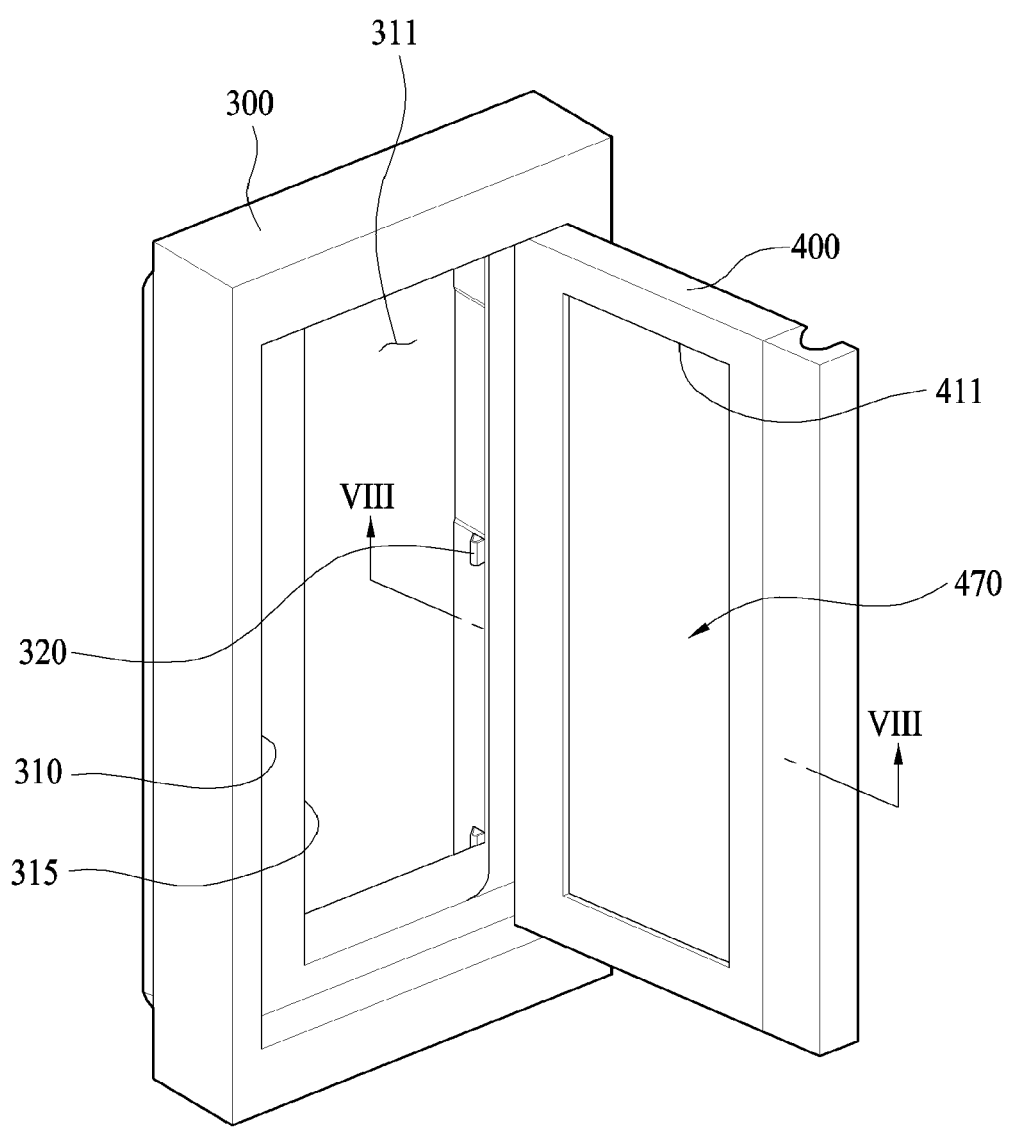
FIG. 6 is a perspective view showing the right door of the refrigerating compartment shown in FIG. 5, which is removed from the refrigerator.

As shown in FIGS. 5 and 6, a right refrigerating compartment door 25 of the refrigerator according to the second embodiment includes a main door 300, which is hingedly coupled to the cabinet 11 and has therein a central opening, and a sub door 400, fitted in the opening in the main door 300 and hingedly coupled thereto.

In the refrigerator according to the first embodiment, the main door and the sub door are the same size when viewed from the front, and the sub door overlaps the main door when the sub door is closed.

In contrast, in the refrigerator according to the second embodiment, the sub door 400 is configured to have a smaller size than that of the main door 300, and is fitted into the opening 310 in the main door 300 when the sub door 400 is closed.

Specifically, in the first embodiment, the sub door 200 is exposed to the front of the main door 100 when the sub door 200 is closed with respect to the main door 100. In the second embodiment, the sub door 400 is fitted in the main door 3000 when the sub door 400 is closed with respect to the main door 300. The former may be referred to as an outside type sub door, and the latter may be referred to as an inside type sub door.

Likewise in this embodiment, the main door 300 may simply be the cabinet. In this case, the sub door 300 may be considered to be a door for opening and closing the storage compartment 11.

As shown in FIG. 6, the main door 300 may be provided at the center thereof with an opening 315, and may be provided at the rear surface thereof with a sub storage compartment 311. In other words, the main door 300 may be provided with an opening 310 into which the sub door 400 is fitted and the opening 315 for allowing access to the sub storage compartment 311. A stepped portion is defined between the two openings 310 and 315. In other words, the opening 315 for allowing access to the sub storage compartment 311 may be positioned inside the opening 310 in the radial direction into which the sub door 400 is fitted.

When the sub door 400 is opened, it is possible to access the sub storage compartment 311 through the opening 315 in the main door 300. That is to say, the sub storage compartment 311 may be accessed by opening only the sub door 400, without having to open the main door 300.

The sub storage compartment may be defined by a plurality of baskets (not shown) installed at different levels. Specifically, a cover (not shown) adapted to surround the plurality of baskets may be provided. The cover may serve as a partition wall for isolating the sub storage compartment and the main storage compartment from each other. Accordingly, the sub storage compartment may be positioned in front of the main storage compartment.

As shown in FIG. 6, a plurality of mounting protrusions 320 for mounting a plurality of baskets (not shown) may be provided at rear regions of the inner surfaces of the opening 315 in the main door 300. The plurality of baskets may be two or three baskets, which are vertically spaced apart from each other by predetermined distances. Accordingly, a user can access the sub storage compartment 311 by opening the sub door 400 while leaving the main door 300 closed, as shown in FIG. 6.

Since the relationship between the main door and the sub door and the relationship between the main storage compartment and the sub storage compartment are common in a DID refrigerator, descriptions thereof are omitted.

The sub door 400 is internally provided with a panel assembly 470 that selectively becomes transparent. Although the panel assembly may be constituted by a single panel, the panel assembly is preferably constituted by a plurality of panels as described hereinafter. The panel assembly 470 may be selectively changed into a see-through panel assembly, and as such, a user can see the internal space behind the door through the panel assembly 470.

More specifically, the sub storage compartment 311 is visible through the panel assembly provided at the opening 411 of the sub door 400 and the opening 315 provided in the main door 300. It is possible to see the interior of the sub storage compartment 311 even in the state in which the sub door 400 is closed, and it is possible to easily perceive where a specific object is positioned in the sub storage compartment 311. Thereafter, a user can easily take a desired object out of the sub storage compartment 311 by opening the sub door 400.

For example, assuming that 12 similar objects are stored in the sub storage compartment 311 in a 4×4 matrix, a somewhat long period of time may be required to open the sub door 400, find a desired specific object among the 12 similar objects and take the desired object out of the sub storage compartment 311. However, in the case where the 12 similar objects are visible from the outside, there is no need to take time to find and select the specific object. Specifically, since a user has already seen the position of the specific object, the user can quickly take out the specific object after merely opening the sub door 400. Therefore, it is possible to minimize the loss of cold air and to improve the user's convenience.

Hereinafter, the structure of the sub door 400 will be described in detail with reference to FIGS. 7 and 8.

The sub door 400 according to this embodiment includes a door frame 405 having a central opening 411.

The door frame 405 may include an inner frame 410 constituting the marginal region of the rear side of the sub door 400, and a door liner 480, coupled to the inner frame 410 to constitute the marginal region of the rear surface of the sub door 400.

Unlike the first embodiment, the inner frame 410 and the door liner 480 may be integrally formed with portions corresponding to cap decorations provided at the upper and lower ends thereof without providing separate cap decorations.

Supports 450 may be respectively disposed between upper ends of the inner frame 410 and the door liner 480 and between the lower ends of the inner frame 410 and the door liner 480.

An upper hinge bracket 454 and a lower hinge bracket 456 may be respectively coupled to one side of the upper support 450 and one side of the lower support 450. Sub door hinges may be respectively coupled to the upper hinge bracket 454 and the lower hinge bracket 456.

Unlike the construction shown in the drawings, the cap decorations may be respectively coupled to upper ends and lower ends of the inner frame 410 and the door liner 480, and upper and lower hinges (not shown) may be directly coupled to the cap decorations.

The door liner 480 may be provided at the rear surface thereof with a groove in which a gasket 490 is fitted. When the sub door 400 is closed with respect to the main door 300, the gasket 490 serves to seal the clearance between the sub door 400 and the main door 300, thus preventing the leakage of cold air. Specifically, the gasket 490 may be disposed at the position between the two openings 310 and 315.

Figure 7:
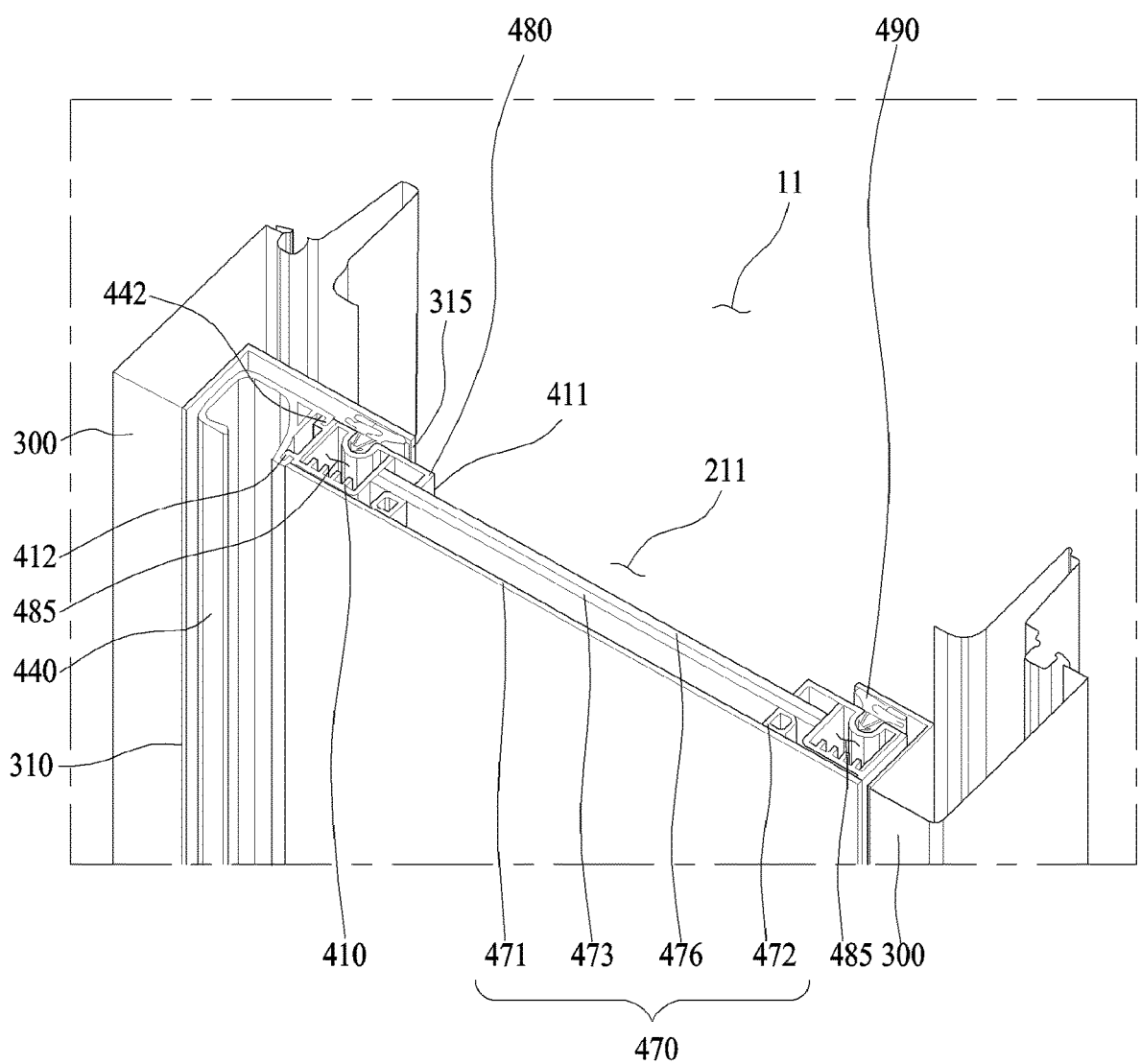
FIG. 7 is a perspective view of the right door, which is cut away along line VIII-VIII of FIG. 6.
Figure 8:
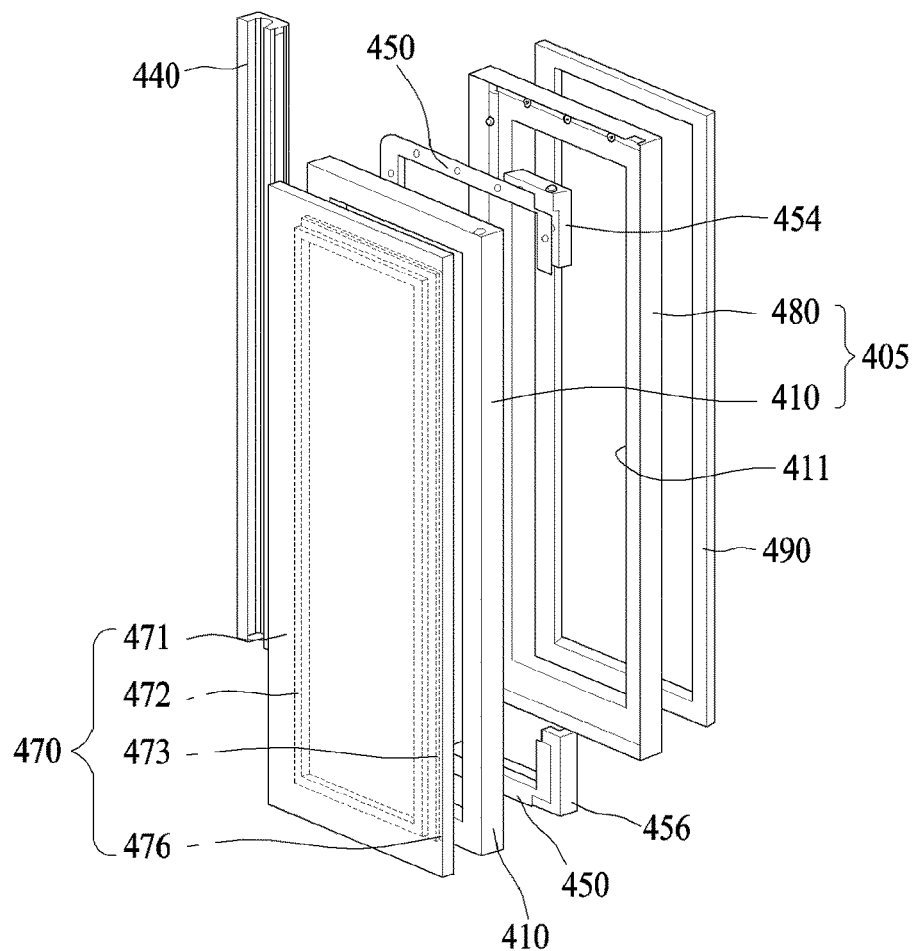
FIG. 8 is an exploded perspective view of a sub door of FIG. 6.

As shown in FIGS. 7 and 8, the panel assembly 470 of the sub door 400 according to the second embodiment is coupled to the front surface of the sub door 400. Specifically, the panel assembly 470 may be coupled to the inner frame 410 from the front.

The panel assembly 470 may be identical or similar to the panel assembly of the first embodiment. However, the front panel 471 of the panel assembly 470 according to this embodiment is distinguished from the first embodiment in that the front panel 471 is not covered at the marginal area thereof with the outer door 210 but is coupled to the front surface of the inner frame 410 having the opening.

In the first embodiment, the marginal region of the front surface of the sub door 200 is constituted by the outer door 210 and the central region of the front surface of the sub door 200 is constituted by the front panel 271. According to the second embodiment, the front surface of the sub door 400 is preferably constituted by the front panel 471. In other words, the marginal region and the central region of the front surface of the sub door 400 are preferably constituted by the front panel 271.

To this end, the front panel 471 is preferably configured to be larger than the plurality of thermal insulation panels 473 and 476. That is, the front panel 471 preferably not only covers the entire area of the thermal insulation panels but also extends outward beyond the boundary of the entire area.

The plurality of thermal insulation panels 473 and 476 may be fitted on the inner surface of the opening in the inner frame 410, that is, on the inner surface of the opening 411, and the rear surface of the second thermal insulation panel 476 may be supported by the door liner 480.

A rectangular spacer rod 472 may be interposed between the front panel 471 and the first thermal insulation panel 473 so as to maintain a predetermined spacing therebetween.

A handle may be coupled to the left side of the inner frame 410 and the door liner 480, which are coupled to each other.

For the purpose of coupling between the inner frame 410 and the handle 440, the left side surface of the inner frame 410 may be provided with a pair of catch ribs 412, which engage with a pair of fitting ribs 442 vertically formed on the right side surface of the handle 440.

The pair of catch ribs 412 may be configured in such a manner as to laterally project from the left side surface of the inner frame 410 and then be respectively bent forward and rearward.

In order to match the catch ribs 412, the pair of fitting ribs 442 may be configured to be laterally projected from the right side surface of the handle 440 and then be respectively bent forward and rearward.

As a consequence of coupling between the inner frame 410 and the door liner 480, a predetermined space 485 is defined in the marginal portion of the sub door 400. The space 485 may also be defined by coupling the cap decorations to the inner frame 41 and the door liner 480. In other words, the space 485 is defined in the upper and lower marginal portions and both lateral side portions of the sub door 400. The space may be referred to as a filling space that is filled with a thermal insulation material.

Accordingly, the marginal portion of the sub door 400 may be thermally insulated by the thermal insulation material, and the central portion of the sub door 400 may be thermally insulated by the panel assembly 470.

The region of the front panel 471 that is positioned outside the thermal insulation panel in the radial direction may be in close contact with the inner frame 410. The region of the front panel 471 may also be in close contact with the cap decorations. The latter is the case where the upper and lower portions of the inner frame are constituted by separate cap decorations.

After the handle 440 is coupled to the inner frame 410, the cap decorations may be coupled to the inner frame 410 if necessary. Subsequently, the panel assembly 470 may come into close contact with the inner frame 410 from the front. At this point, the inner frame 410 and the panel assembly 470 may be temporarily coupled to each other by disposing a piece of transparent adhesive tape or a transparent adhesive therebetween. Specifically, the transparent adhesive tape may be disposed between the inner frame 410 and the rear surface of the marginal region of the front panel 471 (i.e. the marginal region positioned outside the thermal insulation panel in the radial direction).

After the panel assembly 470 is temporarily coupled to the inner frame 410, the door liner 480 may be coupled to the inner frame 410 from the rear position of the inner frame 410. Thereafter, the space 485 is filled with a foamed material, with the result that the panel assembly 470 is closely coupled to the door frame 405.

Hereinafter, the structure and the process of fabricating the panel assembly will be described with reference to FIG. 9.

Figure 9:
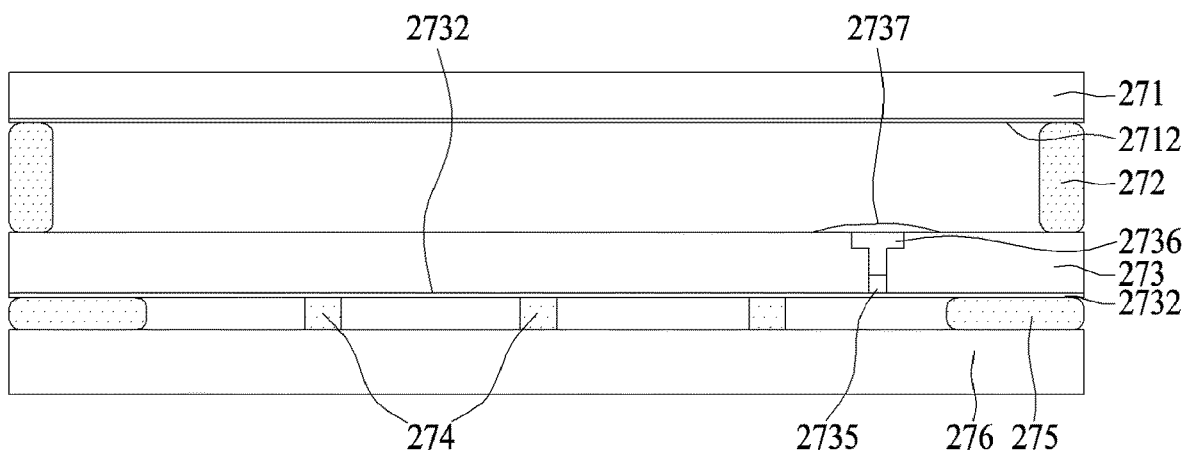
FIG. 9 is a cross-sectional view showing a front panel and a thermal insulation panel of the sub door according to the first embodiment, which are assembled with each other.

FIG. 9 is a schematic view of the panel assembly 270 according to the first embodiment of the present invention. The panel assembly 270 may be substantially identical to the panel assembly 470 according to the second embodiment except that the front panel 271 is the same size as the thermal insulation panels 273 and 276.

The front panel 271 is preferably made of thermally hardened glass that is enhanced in strength by being heated to about 600 to 700° C.

In the thermal hardening process, the glass may be heated above the glass-transition temperature (Tg) and may then be rapidly cooled so as to create compression stress due to the difference in shrinkage between the inner portion and the outer portion of the glass.

The depth of the compression stress in the thermal hardening process is about 20% of the overall thickness of the glass.

The rear surface of the front panel 271 may be vapor-deposited with metal, such as titanium or nickel, so as to create a deposited layer 2712. When the lighting device in the storage compartment is activated, the deposited layer 2712 may allow the light emitted from the lighting device to be transmitted to the outside through the front panel 271, thus making the interior of the storage compartment visible. Meanwhile, when the lighting device is deactivated, the deposited layer shields the interior of the storage compartment, thus making the interior of the storage compartment invisible. Of course, the front panel 271 may be made of glass, or may be provided thereon with a color coating layer.

Accordingly, it is preferable that the front panel 271 be converted into a see-through panel when light is transmitted therethrough and be converted into an opaque panel when light is not transmitted therethrough. It is further preferable that the front panel 271 enable light to be elegantly transmitted therethrough, unlike general window glass. Thanks to this effect, the atmosphere of the room in which the refrigerator is positioned may be made more elegant.

The first thermal insulation panel 273 and the second thermal insulation panel 276 are preferably made of chemically strengthened glass that was produced by soaking the glass in electrolyte solution at the glass transition temperature or higher.

In the chemical strengthening process, when glass in an electrolyte solution containing molten salt, such as $KNO_3$, is heated to a temperature below the glass transition temperature, some of the sodium ions on the glass are replaced with potassium ions, thus creating compression stress caused by the difference between the ionic radii.

In the chemical strengthening process, the depth of compression stress may be about 2 to 3% of the overall thickness of the glass.

The rear surface of the first thermal insulation panel 273 may be provided with a low-emissivity coating layer 2732 for reducing radiative heat transfer to the inside of the storage compartment.

Glass equipped with such a low-emissivity coating layer 2732 is referred to as a low-c glass. The low-emissivity coating layer 2732 is typically created by depositing the surface of glass with silver or the like through sputtering.

A vacuum space may be defined between the first thermal insulation panel 273 and the second thermal insulation panel 276. To this end, the first thermal insulation panel 273 includes a hole 2735 through which vacuum pumping is executed.

The hole 2735 is plugged with a plug 2736. The plug 2736 is inserted into the hole 2735 so as to plug the hole 2735 after completion of the vacuum pumping.

The process of coupling the first thermal insulation panel 273 and the second thermal insulation panel 276 and forming the vacuum space therebetween will now be described.

Frit glass 275 is first dispensed onto the marginal area of the second thermal insulation panel 276. Frit glass 275 is a glass raw material composed of glass powder having a melting point of about 400-500° C., a binder, and the like. The frit glass 275 has a melting point lower than the first and second thermal insulation panels 273 and 276.

After the frit glass 275 is arranged along the marginal area of the front surface of the second thermal insulation panel 276, the first thermal insulation panel 273 is placed thereon. Thereafter, the frit glass 275 is melted and then solidified, thus coupling the first and second thermal insulation panels to each other.

Prior to placing the first thermal insulation panel 273 after the frit glass 275 is arranged, a plurality of spacers 274 are arranged on the second thermal insulation panel 276.

Since there is a limit to which the thickness and strength of the thermal insulation panel, which is made of glass, can be increased, the plurality of spacers 274 serves to support the center area of the thermal insulation panel so as to prevent the center area from drooping.

The spacers 274 may be made of stainless steel, glass, plastic, or the like. The spacers 274 are preferably made of a material capable of supporting the first thermal insulation panel 273 and the second thermal insulation panel 276 in the state of maintaining a predetermined spacing therebetween and of almost completely eliminating conductive heat transfer.

After the first thermal insulation panel 273 is coupled to the second thermal insulation panel 276, vacuum pumping is executed through the hole 2735 to create a vacuum between the first thermal insulation panel 273 and the second thermal insulation panel 276.

After the vacuum pumping, the hole 2735 is plugged with the plug 2736. The plug 2737 may be covered by frit glass 2737. In this case, the plug 2736 may not protrude from the surface of the first thermal insulation panel 273, and the frit glass 2737 may be slightly convex from the surface of the first thermal insulation panel 273.

The frit glass 2737 may have a lower melting point than the frit glass 275 disposed between the first and second thermal insulation panels 273 and 276.

After the operation of coupling the first and second thermal insulation panels 273 and 276 to each other and of performing the vacuum pumping and the sealing is completed, the rectangular spacer rod 272 having a predetermined thickness is placed on the front surface of the first thermal insulation panel 273, and the front panel 271 is attached thereto.

The spacer rod 272, the first thermal insulation panel 273 and the front panel 271 are attached to each other by means of a transparent adhesive applied therebetween.

Figure 4:
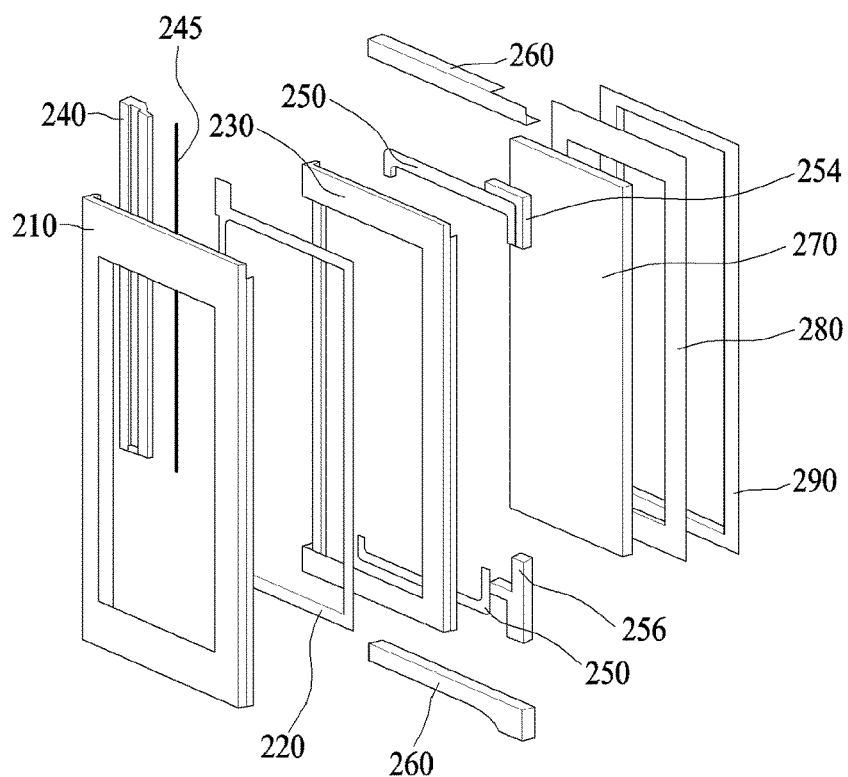
FIG. 4 is an exploded perspective view of a sub door of FIG. 2.

As shown in FIG. 4, the panel assembly 270, which has been prepared in this way, is disposed between the outer door 210 and the door liner 280, and the outer door 210 and the door liner 280 are coupled to each other, thus completing fabrication of the sub door 200.

In the second embodiment, the panel assembly 370 may be attached to the front surface of the inner frame 410 using a transparent adhesive. At this point, the first and second thermal insulation panels 473 and 476 are disposed in the opening in the inner frame 410, and the marginal area of the front panel 471 is attached to the front surface of the inner frame 410.

The thermal insulation panel is composed of a plurality of glass panels, which are provided therebetween with the space for hindering heat transfer therebetween. Furthermore, since the glass panels are made of low-emissivity coating glass, it is possible to minimize heat transmitted through the panel assembly 470.

Figure 10:
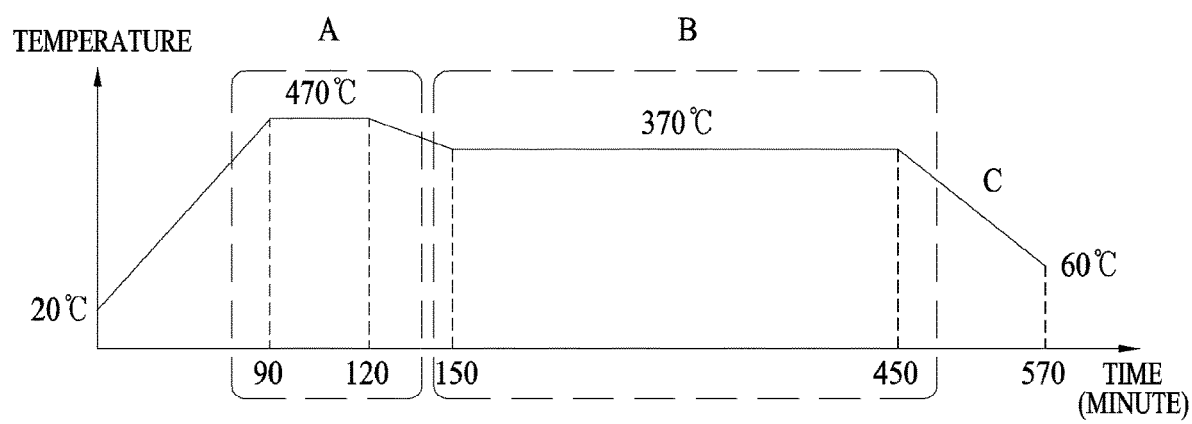
FIG. 10 is a graph showing the variation in temperature during a pumping type process, which includes welding, vacuum pumping and sealing, in manufacture of the door.
Figure 11:
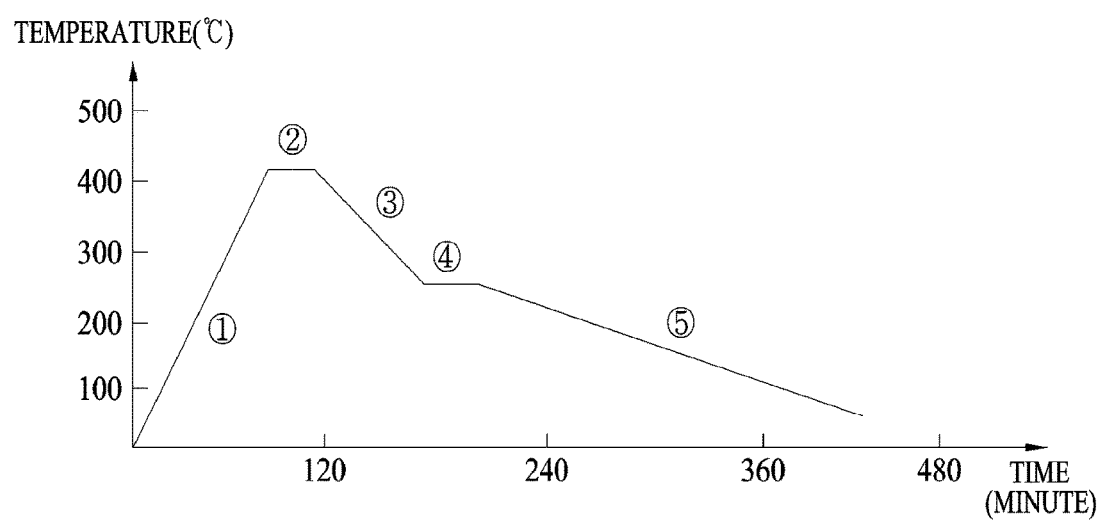
FIG. 11 is a graph showing the variation in temperature during welding and sealing processes performed in a vacuum chamber.

FIG. 10 is a graph illustrating the variation in temperature of two thermal insulation panels when a vacuum insulation space is created between the two thermal insulation panels using vacuum-pumping technology. FIG. 11 is a graph illustrating the variation in temperature of two thermal insulation panels when a vacuum insulation space is created between the two thermal insulation panels using vacuum-chamber technology.

In the vacuum-pumping technology shown in FIG. 10, when the frit glass 275 is heated for welding in a heating apparatus, the frit glass 275 may be heated to about 470° C.

The welding operation is indicated by character "A" in FIG. 10. In the welding operation, the frit glass 275 is heated to about 470° C. from the ambient temperature, i.e. 20° C., for about 90 minutes. The heating temperature is set to be the melting point of the frit glass 275 or higher, and may be heated to a temperature range of 300-400° C. depending on the kind of frit glass.

The welding operation is maintained at about 470° C. for about 30 minutes, and the temperature is then lowered to about 370° C. for about 30 minutes.

The operation of creating the vacuum and sealing, which is indicated by character "B", may be performed at about 370° C.

The operation of creating the vacuum and sealing may be performed for about 5 hours with maintenance of the temperature is maintained at about 370° C.

The operation of creating the vacuum and sealing is performed in such a way as to connect a pipe of a vacuum-pumping device to the hole 2735 so as to execute vacuum pumping, plug the hole 2735 with the plug 2736, and seal the hole by welding the frit glass 2737.

The temperature of 370° C. is determined in consideration of the melting point of the frit glass 2737, and the operation of creating the vacuum and sealing may be carried out at a temperature range of 300-400° C. depending on the kind of frit glass 2737.

The pipe of the vacuum-pumping device may be cut after vacuum pumping such that the end portion of the pipe fitted in the hole 2735 serves as the plug 2736.

Subsequently, the spacer rod 272 is placed on the front surface of the first thermal insulation panel 273, and the front panel 271 is attached to the spacer rod 272 using a transparent adhesive.

The outer circumferential surfaces of the first thermal insulation panel 273, the frit glass 275, the second thermal insulation panel 276, the spacer rod 272 and the front panel 271 may be sealed using a sealant.

Thereafter, in the operation indicated by character "C" in FIG. 10, the components may be cooled to 60° C. from 370° C. in about 2 hours, thus completing fabrication of the panel assembly 270.

Meanwhile, the vacuum chamber technology illustrated in FIG. 11, which is configured to fabricate the panel assembly in a vacuum chamber, includes (1) a vacuum heating operation, (2) a vacuum welding operation, (3) a first cooling operation, (4) a capping operation, and (5) a second cooling operation.

In the vacuum heating operation (1), the frit glass 275 is dispensed to the marginal area of the first thermal insulation panel 273 disposed in a vacuum chamber, and the plurality of spacers 274 are arranged thereon. The second thermal insulation panel 276 is placed thereon. The air in the vacuum chamber is removed to create a vacuum in the chamber. Subsequently, the vacuum chamber is heated to about 420° C. in about 80 minutes to raise the internal temperature in the vacuum chamber.

In the vacuum welding operation (2), the internal temperature in the vacuum chamber is maintained at about 420° C. for 40 minutes such that the frit glass 275 is melted so as to weld the second thermal insulation panel 276 to the first thermal insulation panel 273.

In the first cooling operation (3), the resulting components are cooled to about 250° C. from about 420° C. in 1 hour.

In the capping operation (4), the hole 2735 is plugged with the plug 2736, and the clearance between the hole 2735 and the plug 2736 is completely sealed with the frit glass 2737.

In the second cooling operation (5), the resulting components are gradually cooled to the ambient temperature from about 250° C. for about 5 hours, thus completing the fabrication of the panel assembly 270.

A comparison between the two technologies for creating a vacuum will now be made below.

Although the vacuum-pumping technology is easily applied to the present invention because the technology has generally been used in creating vacuums, the technology has a disadvantage of leaving a cut end of a pipe after the creation of the vacuum. Hence, the hole must be formed at a position that is invisible from the outside of the sub door.

Since the panel assembly according to the embodiments of the present invention is made of transparent glass, it should be noted that the cut end must be invisible. Accordingly, the positioning of the hole is extremely restrictive, and it may be required to provide an additional part for shielding the hole.

In the vacuum chamber technology, since the work of assembling the components is carried out in a vacuum chamber, the vacuum chamber must be sufficiently large to accommodate both the front panel and the thermal insulation panel.

Meanwhile, since the assembly work is carried out in the vacuum chamber, the cut pipe is not left in the hole after completion of the assembly, and the hole may be easily sealed. However, since the hole must be still formed in the transparent thermal insulation panel, it may be required to provide an additional part for shielding the hole.

The vacuum space of the panel assembly 270 and 470 provides a remarkable effect in terms of thermal insulation performance. However, the panel assembly may make fabrication difficult, and may make the design thereof unpleasant due to the presence of the hole. Accordingly, an inert gas space, which is filled with argon or the like, may be provided in place of the vacuum space. Inert gas has better thermal insulation performance than air. For this reason, it is possible to provide space between the front panel and the thermal insulation panel and between thermal insulation panels, and to fill the spaces with inert gas so as to ensure thermal insulation performance.

As described above, the main door or the sub door according to the embodiments of the present invention may be selectively converted into a see-through door. Specifically, upon the input of specific command from a user, the main door or the sub door may be converted into a see-through door.

The conversion into a see-through door may be implemented by activating the lighting device 600 disposed in the storage compartment. Upon activation of the lighting device 600 in the storage compartment, the storage compartment becomes bright. Accordingly, the light in the storage compartment is transmitted to the outside through the door, whereby the interior of the storage compartment becomes visible through the door from the outside.

The kind of user input for conversion into a see-through door may vary. Furthermore, the kind of sensor for detecting such user input may also vary.

The refrigerator according to the embodiment of the present invention may include a sensor for detecting user input for the conversion to a see-through door.

Specifically, the sensor 500 is preferably a sensor for detecting sound waves propagating through a medium. The user input may be detected by identifying sound waves, detected by the sensor, as a certain pattern of sound waves.

This indicates that the sensor 500 can detect the occurrence of a vibration even when the position at which the sound waves are generated is spaced apart from the position at which the sound waves are detected, as long as the medium is continuous. In other words, considering the entire surface area of the refrigerator door, this indicates that the distance between the sound wave generation position and the sound wave detecting position can be maximally increased as long as the continuity of the medium of the refrigerator door is maintained.

The sound wave generating position may be considered to be the position at which the user input for conversion into a see-through door is applied, and the sound wave detecting position may be considered to be the position at which the user input is detected by the sensor. Therefore, by adoption of the sensor for detecting sound waves, the position and manner in which the user input is applied may be variously changed regardless of what the posture a user assumes or whether a user is holding objects with both hands.

According to this embodiment, by virtue of the adoption of the sound wave sensor, a user can apply input to the front surface of the door at any position. Furthermore, the sensor may be located at any position on the door without limitation. In this regard, considering the characteristics of sound waves, the same continuous medium is preferably provided between the position at which a specific vibration input is applied and the position at which the vibration input is detected. In other words, it is preferable that sound waves, which are generated by user knock input applied at a certain position, be transmitted to a predetermined position through a consistent medium for detection.

The sensor 500 may include a microphone for measuring sound waves substantially transmitted through a medium. Although the medium of the front panel is different from air, sound waves may be efficiently transmitted to a point very far away because of the inherent property of sound waves.

For example, when a person puts his/her ear to a train rail, the person can perceive that there is a running train at a location very far away. This indicates that sound waves are efficiently transmitted a long distance through the train rail, which serves as a medium.

Of course, vibrations of the medium itself rather than sound waves generated by a user knock input may be generated.

However, vibrations of a medium are transmitted through the surface of the medium. That is, the vibrations may be referred to as transverse waves. Accordingly, as the distance between the input position and the detection position in the same medium is increased, the damping width is increased. In contrast, the damping width of sound waves is very small. Accordingly, considering the size of a refrigerator, it is considered more efficient to detect sound waves transmitted through the inside of the medium rather than vibrations transmitted through the surface of the medium.

The sensor for detecting sound waves is intended to detect the transmission of sound waves through the front panel itself. Accordingly, it is possible to obviate the mounting of an additional device, such as a touch panel, to the front panel. This indicates that it is possible to eliminate disadvantages, such as increased cost and complexity and decreased durability, attributable to the addition of a touch panel. Furthermore, this indicates that the knock input area can be substantially extended over the entire area of the front panel.

As described above, the front panel according to this embodiment is preferably constituted as a medium through which a sound wave caused by user input is transmitted. In other words, it is preferable that user input be applied to the front panel, which is exposed from the front face of the door, and that the sound wave transmitted through the front panel be detected by the sensor. The sensor may include a sensor device, particularly a microphone, for detecting the transmission of sound waves through a medium.

When a microphone is used as the sensor device, the sound waves transmitted through the front panel are transmitted to the microphone through the air, which serves as another medium. Accordingly, it may be critical to shield the sound wave transmitting space, located between the front panel and the microphone, from the outside. This is because external noise may be input to the microphone if the space is not shielded. Accordingly, it is critical to keep the microphone module, including the microphone, in close contact with the front panel and to maintain such close contact, as will be described later. Furthermore, it is also critical to continuously apply a force to a support member for supporting the microphone in the contact direction. That is, the support member may also be caused to closely contact the front panel.

Accordingly, the input position can be spaced apart from the detecting position by virtue of transmission through the front panel even if no additional touch panel is provided. Particularly, the damping of sound waves transmitted through a medium is comparatively very small, whereby the spacing distance can be more efficiently increased.

In the embodiments of the present invention, it is preferable that the knock input from a user be applied to the center area of the door, which is convertible into a see-thorough area, and that the sensor for detecting the user input be provided at the marginal area of the door, which is not convertible into a see-through area. Of course, the point to which the knock input is applied and the point at which the vibration is detected are preferably positioned on a single front panel constituted by a continuous medium. Discontinuity of the medium means that variation in the detection value may be higher depending on the position at which knock input is generated even when the same vibration input is applied. Hence, the detection accuracy is inevitably decreased.

Furthermore, this indicates that the danger of determining that input applied to a medium other than the front panel is a normal knock input can be reduced. In other words, this indicates that a malfunction whereby an impact applied not to the front panel but to another portion of a refrigerator, is recognized as normal knock input can be remarkably decreased. This is because the cabinet of a refrigerator is typically constituted by a medium different from that of the front panel.

For this reason, it is strongly preferable that the knock input application point and the knock input detection point be positioned on a single front panel as in the embodiments of the present invention.

The impact applied to other portions of the refrigerator may be the vibration of the refrigerator itself. Any portion of the refrigerator may vibrate due to various causes, such as the vibrations caused by driving of the refrigeration cycle or vibrations caused by external force applied to the refrigerator. At this time, the vibrations of the refrigerator may be transmitted through the front panel, thus influencing the sensor. In other words, when an intensive vibration is generated, the front panel itself inevitably vibrates, even if the two media are different from each other. Accordingly, there may be a circumstance whereby, when vibrations of the medium itself are detected, the vibrations of the refrigerator itself are falsely recognized as normal knock input.

However, it is known that the damping width of sound waves through different, i.e. discontinuous, media is increased. Accordingly, sound waves generated by an impact applied not to the front panel but to another portion of the refrigerator may be sufficiently dampened while being transmitted through the different media. Therefore, when the knock input is recognized by detecting sound waves, the malfunctions caused by impacts or vibrations applied to portions other than the front panel can be remarkably reduced. Specifically, in the case where the microphone for detecting sound waves is used, since the microphone is less sensitive to the vibration of the refrigerator itself, errors whereby the vibration of the refrigerator itself is recognized as normal knock input can be remarkably reduced.

Figure 12:
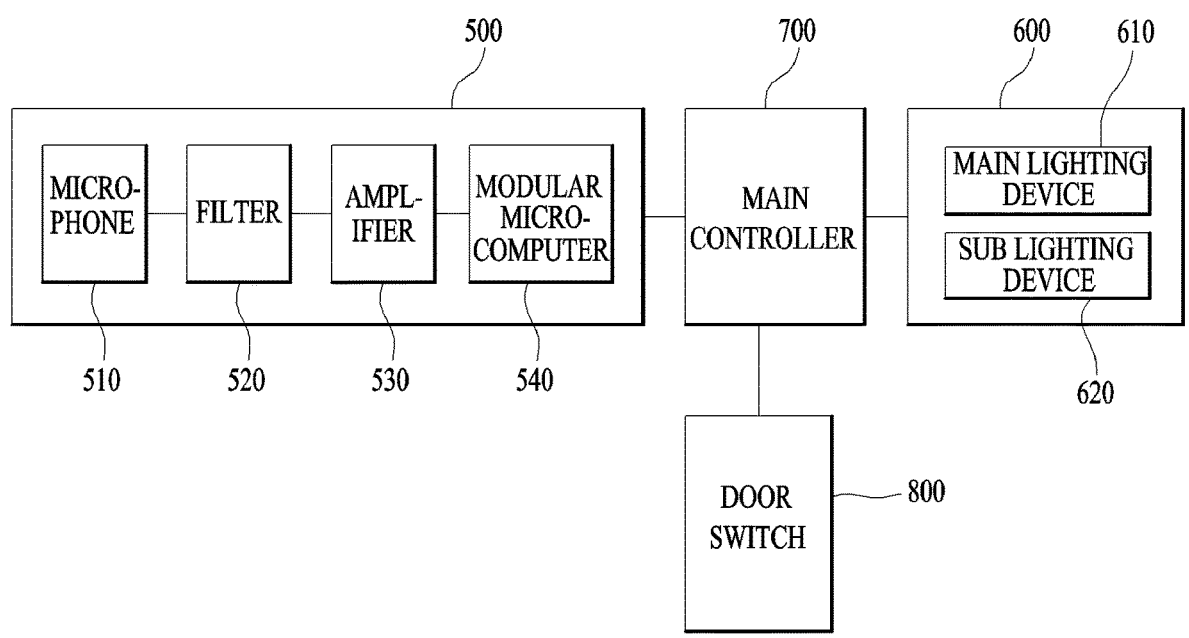
FIG. 12 is a block diagram showing a control construction according to an embodiment of the present invention.

As shown in FIG. 12, the refrigerator according to this embodiment of the present invention may include the sensor 500 for detecting user input for conversion into the see-through door, a main controller 700 and the lighting device 600.

The sensor 500 may be provided on the front surface of the door, for example, the front panel 271 or 471 of the sub door 200 or 400, so as to detect the knock input by a user. In other words, the sensor 500 may be provided on the front panel so as to detect the knock input that is applied thereto by a user.

When the normal input for conversion into a see-through door is correctly applied by a user, the main controller 700 activates the lighting device 600. As a result, the interior of the storage compartment is brightened, whereby the door is converted into a see-through door.

Specifically, the sensor 500 may include a second device for detecting input for conversion into the see-through door. In particular, the sensor 500 may include a microphone 510 as a sensor device for detecting sound waves. In other words, the sensor 500 preferably includes the microphone 510, which is configured to detect sound waves transmitted through the inside of a medium rather than detecting the vibration of the medium itself.

The microphone 510 may detect not only sound waves caused by a user's knock signal but also sound waves caused by external noise. The latter kind of sound wave or vibration may be referred to simply as "noise". Accordingly, it is necessary to mechanically prevent such noise from being input to the microphone 510.

To this end, the microphone 510 is preferably in close contact with the medium. In particular, the microphone 510 is preferably in close contact with the front panel 271 or 471. Accordingly, a mounting member or support member for causing the microphone 510 to closely contact the front panel is required. The concrete embodiments of the member will be described later.

The main controller 700 may be considered a main microcomputer adapted to perform general control of a refrigerator, that is, a controller for controlling the driving of a compressor or various fans.

The refrigerator is typically provided with a door switch 800. Therefore, it is possible to determine whether or not the refrigerator door is opened based on the door switch 800. When the door is opened, the door switch 500 is switched to the ON state so as to activate the lighting device 600 in the storage compartment. When the door is closed, the door switch is switched to the OFF state, whereby the lighting device 600 in the storage compartment is deactivated. The ON state and OFF state of the door switch may be reversed with each other. The operation of the door switch 800 and the lighting device 600 may be implemented independently from the controller 700. Of course, it will also be possible for the controller 700 to determine whether the door is open or closed by virtue of the door switch 800, to thus control the lighting device 600 depending on the determination.

In this embodiment, the process of controlling the door switch 800, the main controller 700 and the lighting device 600 may be performed in two ways. The lighting device 600 may include a main lighting device 610 and a sub lighting device 620.

An operational example in which the main door itself is converted into a see-through door is first described.

For the conversion into a see-through door, the main controller 700 may operate the lighting device 600, in particular, the main lighting device 610. The conversion into a see-through door is preferably implemented under the assumption that the main door is in a closed state. Accordingly, in response to the determination of input of the normal knock signal, the main controller 700 preferably controls the main lighting device 610 to operate even if the door switch 800 is in an ON state (the door is closed). The main controller 700 may control the operation of the main lighting device 610 in accordance with the algorithm for conversion into a see-through door as long as the door is not opened. For example, the main controller 700 may control the main lighting device such that the brightness of the lighting device is gradually increased. Furthermore, it is possible to control the main lighting device such that the main lighting device stops after the main lighting device has been operating for a predetermined period of time. In other words, it is possible to control the main lighting device so that it turns off after a predetermined period of time has elapsed.

In the case where the door is opened while conversion into a see-through door is maintained, the algorithm may be overridden by the normal control algorithm for the main lighting device 610. In other words, control may be performed such that the main lighting device 610 is always operated while the main door is opened. Of course, it may also be controlled such that an alarm is generated and the main lighting device 610 is turned off when the door has remained in an open state for an excessively long period of time.

An operational example in which not the main door but the sub door is converted into a see-through door will now be described. In this example, the sub lighting device 620 for making the interior of the sub storage compartment bright is preferably provided, in addition to the main lighting device 610 for making the storage compartment bright.

Although not shown in the drawings, the sub lighting device 620 may include an LED module mounted on one or both inner sides of the opening 115 or 215 of the main door 100 to illuminate the sub storage compartment. The LED module may be constituted by an elongated circuit board and a plurality of LEDs arranged on the circuit board at predetermined intervals.

The LED module is preferably mounted in a groove formed in both inner sides of the opening in the main door 100 and is preferably covered by a transparent cover so as to protect the LED module and prevent the entry of moisture or pollutants.

In response to the determination of input of the normal knock signal, the main controller 700 may activate the sub lighting device 620 to convert the sub door into a see-through door. At this time, the sub lighting device 620 is preferably controlled to be operated for a predetermined period of time. If a predetermined time has not elapsed when the sub door is opened by a user, the sub lighting device 620 may be controlled to be continuously activated.

If a predetermined time has not elapsed, a user cannot open the main door. In this case, there is no need to maintain the conversion of the sub door into a see-through door. Accordingly, when it is determined that the main door has been opened through the door switch while the sub door is in the state of having been converted into a see-through door, the operation of the sub lighting device 620 is preferably controlled to be stopped.

Consequently, unnecessary operation of the lighting device 600 may be reduced through control of the relationship between the main controller 700, the lighting device 600 and the door switch 800.

The main controller 700 may determine whether a normal signal for conversion into a see-through door has been input, based on the signal input through the sensor 500. Specifically, the main controller 700 may directly determine whether the input signal is a normal signal or noise. In this case, an overload may be applied to the main controller 700, and the effect of noise inherent in the signal line itself may be further increased owing to the distance between the sensor 500 and the main controller 700.

As described above, the sensor 500 is preferably provided on the front panel 271 or 471. In most cases, the main controller 700 is provided on the cabinet 10 rather than the door. Hence, the distance between the sensor 500 and the main controller 700 is increased, which means that the length of the signal line is increased. This indicates that the normal signal for conversion into a see-through door may be contaminated by the noise inherent in the signal line and before being input to the main controller 700. Therefore, the recognition rate of the signal for conversion into a see-through door is inevitably deteriorated. In particular, in the case where the sensor includes a microphone as a sensor device, it is common for the signal output through the microphone to be on the order of mV whereas the signal input to the main controller 700 must be on the order of of V. Hence, it is undesirable for the main controller 700 to determine whether the signal is a normal signal for conversion into a see-through door because of the physical difference in magnitude of the signals.

In particular, refrigerators are electronic appliances that consume high voltage and high current. Accordingly, the amount of electrical noises generated by refrigerators is relatively high. This means that the signal on the order of mV, output through the microphone, is more easily affected by such electrical noise.

In order to solve this problem, according to this embodiment, the sensor 500 for detecting input for conversion into a see-through door is preferably modularized. In this regard, the modularized sensor may be referred to as a sensor module.

The sensor module or knock sensor module, which is denoted by the numeral "500", may include the microphone 510, as the sensor device, and a modular microcomputer 540. As described above, the microphone 510 is a sensor device for detecting a knock on signal, and the modular microcomputer 540 serves to determine whether the signal detected by the microphone 510 is a knock on signal.

For example, the modular microcomputer 540 determines whether the input signal is a normal knock on signal. When the input signal is determined to be a normal knock on signal, the modular microcomputer 540 may send to the main controller 700 a signal indicating that normal knock on input has been applied. When the input signal is determined not to be a normal knock on signal, the modular microcomputer 540 may not send the signal. For example, when the input signal is determined to be a normal knock on signal by the modular microcomputer 540, the modular microcomputer 540 may send a signal of 5V to the main controller 700. In the other case, the modular microcomputer 540 may send a signal of 0V to the main controller 700. The latter is considered to be the case where no signal is sent to the main controller 700.

Since the main controller 700 receives a signal that indicates only that normal knock on signal has been input, the main controller 700 does not perform any additional determination. Consequently, it is possible to minimize the effect of noise inherent in the signal line between the main controller 700 and the modular microcomputer 540. In the same way as above, the modular microcomputer 540 may determine whether a normal knock on signal has been input based on a signal which is input through the modularized microphone and which contains minimal noise. Accordingly, an accurate recognition rate may be realized.

The knock sensor module or sensor module 500 may include a filter 520. The filter 520 serves to eliminate noise from the signal received from the microphone 510. Specifically, the filter 520 may be a noise filter. The filtered signals are preferably amplified through an amplifier. Therefore, the sensor module 500 preferably further include an amplifier 530 for amplifying the filtered signal and transmitting the amplified signal to the modular microcomputer 540. Specifically, the amplifier 530 may be an operational amplifier.

The sensor module 500 preferably includes the filter 520, the amplifier 530 and the modular microcomputer 540 mounted on a single PCB, and the microphone 510 preferably extends from the PCB by means of a signal line. The structure by which the microphone 510 is mounted or secured will be described later.

Hereinafter, the microphone or microphone module as the sensor device is described in detail with reference to FIG. 13.

Figure 13:
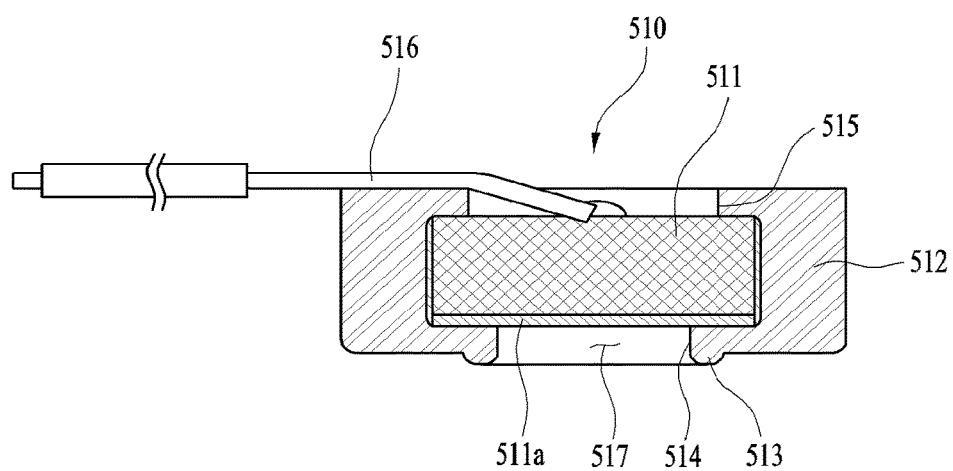
FIG. 13 is a cross-sectional view of a microphone module (sensor device module), which is applicable to the embodiment of the present invention.

As shown in FIG. 13, a microphone 511 is preferably embodied as the microphone module 510. In other words, the microphone 511 for directly detecting sound waves is preferably provided in the state of being received in a receptor 512. Accordingly, the microphone 511 and the microphone receptor 512 may be collectively referred to as the microphone 510 or the microphone module 510.

The microphone 511 may be configured to have a circular plate having a predetermined thickness. The microphone 511 is received in the microphone receptor 512, and the movement of the microphone 511 is thus restricted by the internal structure of the microphone receptor 512. In other words, the microphone 511 is preferably supported such that the microphone 511 floats in the microphone receptor 512.

The microphone receptor 512 is preferably made of a rubber material. Basically, the microphone 511 is closely fitted in the microphone receptor 512. The microphone receptor 512 may be provided at the top and bottom thereof with openings 514 and 515, each of which may have a circular shape.

One side of the microphone 511 is considered to function as a sound wave receiver 511a for receiving sound waves. The sound wave receiver 511a may be oriented to face one of the openings in the microphone receptor 511. For the convenience of illustration, the sound wave receiver 511a is illustrated as facing the lower opening 514.

A signal line 516 is connected to the other side of the microphone 511. The signal line 516 may be connected to the PCB of the knock sensor module through the opening 515, as described above.

A predetermined space is preferably defined between the lower opening 514 and the sound wave receiver 511a. The predetermined space is preferably sealed. To this end, the predetermined space is preferably sealed by causing the lower opening 514 to closely contact the medium, i.e. the front panel 271 or 471.

The predetermined space 517 may also be isolated from the upper opening 515 by the close contact between the microphone 511 and the microphone receptor 512.

In order to prevent the hermetical space from being damaged by the imbalance, a protrusion 513 is preferably provided along the periphery of the lower opening 514. Specifically, even if the distribution of force that acts on the microphone receptor 512 to cause the microphone receptor to closely contact the medium subsequently becomes imbalanced, the hermetical space is effectively maintained by the elastic deformation of the protrusion 513.

Accordingly, one side of the hermetical space is closed by the medium. Consequently, the air in the hermetical space is vibrated by sound waves transmitted through the inside of the medium, and sound waves generated by the vibration may be input to the microphone 511.

By virtue of the hermetical sealing, it is possible to block or suppress the infiltration of external noise or vibrations into the predetermined space. Therefore, the erroneous determination of knock on input or malfunctions attributable to external noise may be remarkably reduced, and the recognition rate of knock on input may be improved. In other words, when a knock on input is applied, the accuracy of the determination of whether a knock on input was applied may be greatly improved.

Hereinafter, the structure for mounting the sensor for detecting input for conversion into a see-through door will be described in detail. In particular, the structure for mounting the sensor will be described in detail under the assumption that the sensor is embodied as the microphone module 510 shown in FIG. 13. For the convenience of illustration, the signal line 516 is not shown in FIG. 14.

An example of the structure for mounting the microphone module 510 is first described with reference to FIG. 14.

According to this embodiment, the front panel 271 may constitute the central area of the door or the sub door, and the door frame 205 may constitute the marginal area of the door or sub door.

Figure 14:
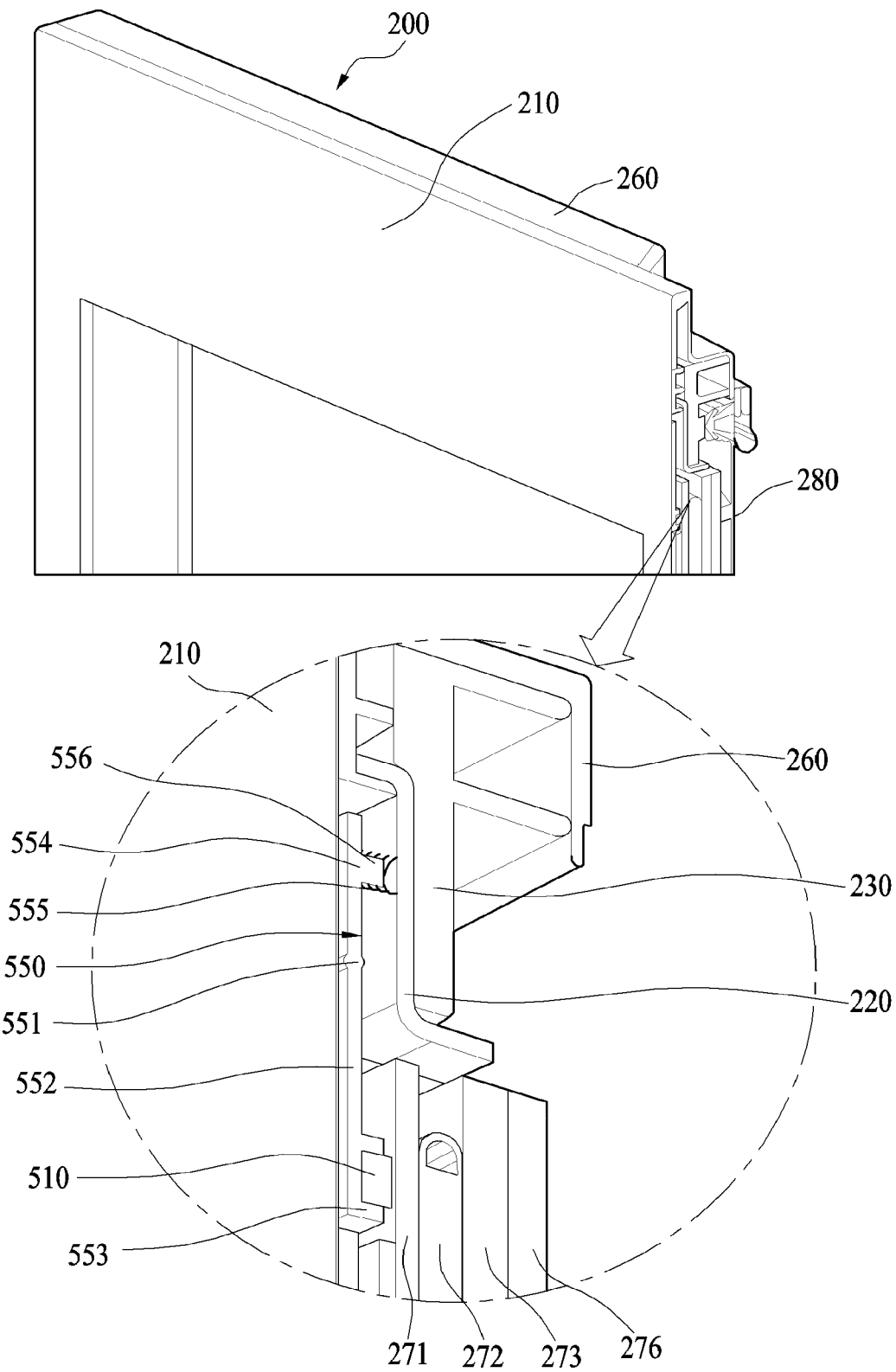
FIG. 14 is a perspective view showing a structure for mounting a sensor device module (microphone module) in the sub door according to the first embodiment, which is partially cut away.

Specifically, FIG. 14 illustrates a partially broken away perspective view and an enlarged view of the structure for mounting the microphone module 510 on the sub door. For the convenience of illustration, the door liner 280 is omitted in FIG. 14.

According to this embodiment, the microphone module 510 is preferably mounted on the front panel 271 in a close-contact manner.

As shown in the drawings, the marginal area of the front panel 271 is covered by the door frame 205, in particular, the outer door 210. The microphone module 510 is disposed between the outer door 210 and the front panel 271. The microphone module 510 is preferably in close contact with the front panel 271.

Specifically, in order to mount the microphone module 510 to the front panel 271 in close-contact manner, a support member 550 is preferably provided. The support member 550 may be disposed between the outer door 210 and the front panel 271. Furthermore, the support member 550 may be disposed between the outer door 210 and the door decoration 220.

Accordingly, both the microphone module 510 and the support member 550 may be positioned outside the opening 211 in the radial direction for the conversion into a see-through door. Therefore, the microphone module 510 and the support member 550 may not be visibly exposed to the front of the door even upon conversion into a see-through door. In addition, since the microphone module 510 and the support member 550 are prevented from being visibly exposed to the outside through the see-through door, the design of the door becomes elegant and neat.

Specifically, the support member 550 preferably includes an elastic element 555. The elastic element 555 is preferably configured to exert an elastic force in the direction of causing close contact of the microphone module 510. Therefore, it is preferable that the support member 555 always be biased toward the microphone module 510.

The support member 550 may include a fulcrum 551, a first extension 552 extending in one direction from the fulcrum 551, and a second extension 554 extending in the opposite direction from the fulcrum 551. The fulcrum 551 may be interposed between the outer door 210 and the door decoration 220.

The first extension 552 may be provided with a holder 553. The holder 553 may be positioned at the end of the first extension 552. The holder 553 may be provided with the microphone module 510 held therein.

The elastic element 555 may be disposed between the second extension 554 and the door decoration 220 so as to exert an elastic force on the second extension 554, thus biasing the second extension 554 forward. The elastic force is converted into an elastic force that pushes the first extension 553 rearward like a seesaw, which is in turn converted through the holder 553 into a force that causes the microphone module 510 to closely contact the front panel 271. Consequently, the elastic force from the elastic element is continuously applied to the microphone module 510 so as to cause the microphone module 510 to closely contact the front panel 271.

If the sub door 200 is configured so as not to include the door decoration 220 and the inner frame 230, the support member 550 will be disposed between the outer door 210 and the door liner 280. Accordingly, the support member 550 may be positioned outside the opening in the door frame 205 in the radial direction.

The elastic element 550 may be a coil spring. The second extension 554 may be provided on the rear surface thereof with a protrusion 556 for supporting the elastic element 555.

Specifically, the elastic element 555 may be compressed a predetermined amount at the time of assembly so as to exert an elastic force that pushes the second extension 554.

Since the elastic element 550 biases the second extension 554, the first extension 552, which is positioned at the opposite side with respect to the fulcrum 551, biasedly pushes the microphone module 510, whereby the microphone module 510 is caused to closely contact the front panel 271. In other words, it is possible to continuously maintain the state in which the microphone module 510 is in close contact with the front surface of the front panel 271.

Therefore, the microphone module 510 can efficiently recognize that a user is tapping the front panel 271.

Hereinafter, another embodiment of the structure for mounting the microphone module 510 will be described with reference to FIGS. 15 and 16.

As in the above embodiment, the microphone module 510 is preferably mounted so as to closely contact the front panel. In addition, the microphone module 510 is mounted on the door frame such that the microphone module 510 does not interfere with the see-through door.

The structure for mounting the microphone module according to this embodiment may be applied to the door shown in FIG. 6. In other words, this structure may be applied to the case where the front panel 471 defines the entire appearance of the front surface of the door.

Specifically, this structure may be applied to a door in which the thermal insulation panel is fitted in the opening and the rear marginal area of the front panel is in close contact with the door frame.

As described above, the door frame 405 may include the inner frame 410. The inner frame 410 may be integrally formed with cap decorations 460, or the cap decorations 460 may be respectively coupled to the upper and lower ends of the inner frame 410.

Figure 15:
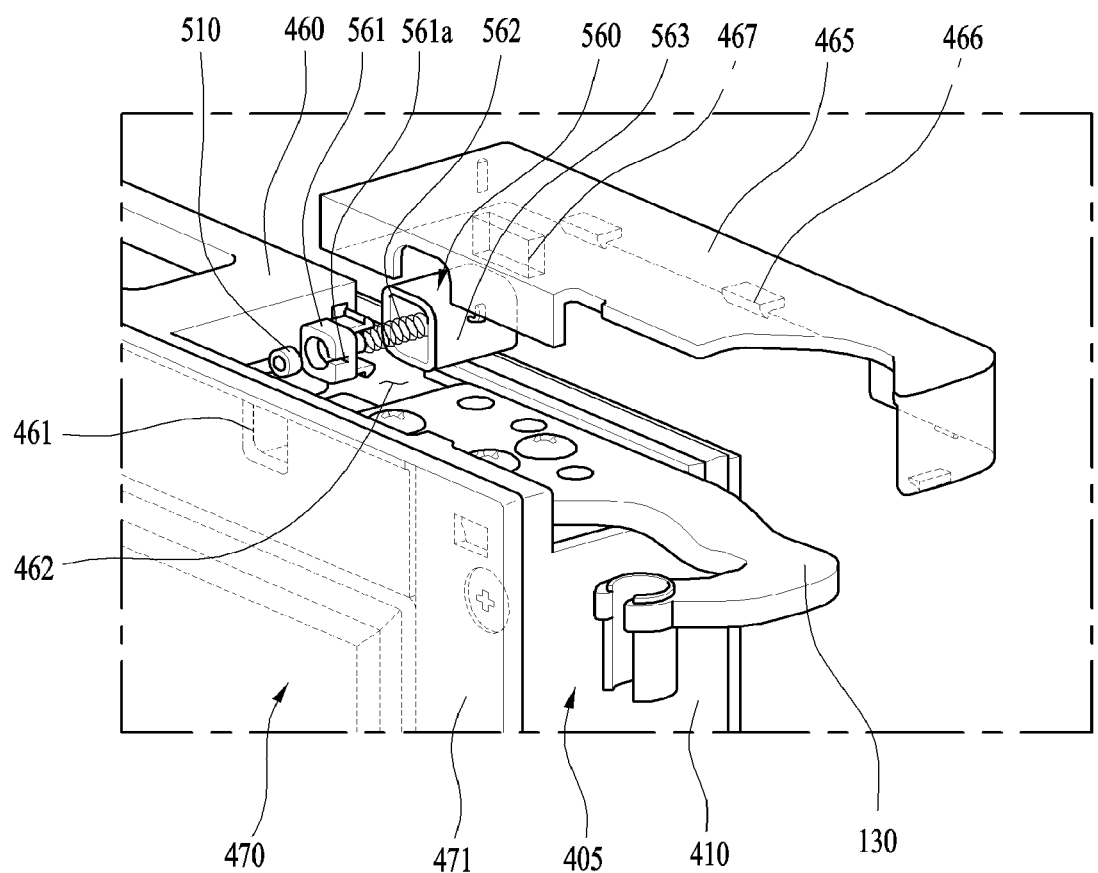
FIG. 15 is a fragmentary perspective view showing a structure for mounting a sensor device module (microphone module) in the sub door according to the second embodiment.
Figure 16:
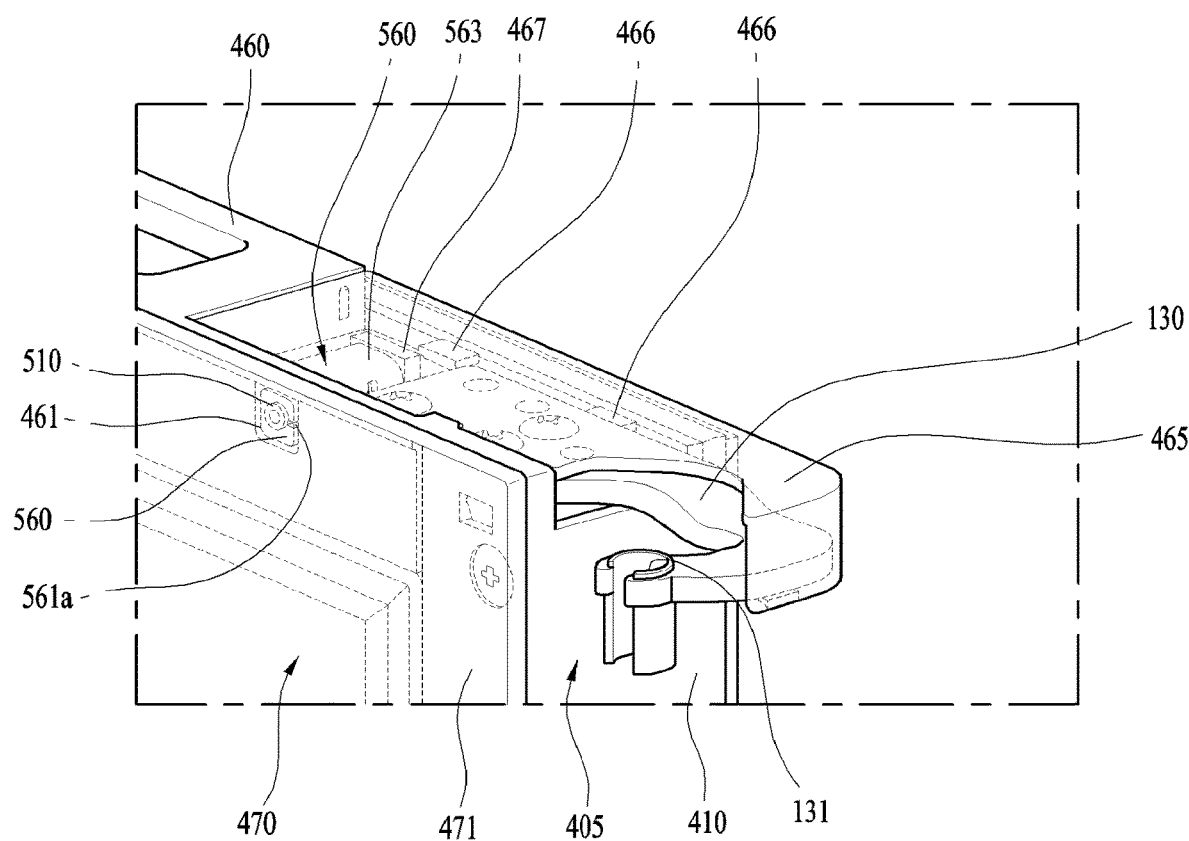
FIG. 16 is a perspective view showing the structure shown in FIG. 15.

Referring to FIGS. 15 and 16, the structure in which the microphone module 510 is mounted by means of the cap decorations 460 is shown.

More specifically, the cap decoration 460 may be provided at the front region thereof with a through hole 461 through which the microphone module 510 passes. The microphone module 510 may closely contact the front panel 471 through the through hole 461.

For the purpose of close contact of the microphone module 510, a support member 560 is provided. The cap decoration 460 may be preferably provided with a seat portion 462 in which the support member 560 is stably received.

The microphone module 510 is at least partially received in a holder 561. Accordingly, it is possible to cause the microphone module 510 to closely contact the front panel and to maintain that state by pushing out the holder 561 toward the front panel 471. Therefore, the support member 560 preferably includes an elastic element 562 for biasedly supporting the holder 561 and exerting an elastic force to the holder 561.

The holder 561 may be provided with a slit or slot 561a through which the signal line 516 shown in FIG. 13 is led out. Specifically, the microphone module 510 may be received in the holder 561, and the signal line 516, for transmitting the signal input to the microphone module 510 to the outside, may extend to the outside from the holder 561 through the slit or slot 561a.

When the holder itself is made of a flexible material, the signal line 516 may be fitted in the slit or slot 561a, and may thus be stably supported thereby.

The support member 560 may include a holder receptor 563 for receiving the holder 561. The elastic element 562 may be disposed between the holder 561 and the holder receptor 563. Therefore, the holder 561 is always biased forward with respect to the holder receptor 563.

The holder receptor 563 may be seated in the seat portion 462 such that the holder receptor 563 is always pushed forward. Specifically, the support member 560 including the holder receptor 563 may be securely seated in place in the seat portion 462, and, as such, a force for supporting the support member 560 forward may be applied to the support member 560 by itself.

To this end, a cover may be provided so as to cover the seat portion 462. The cover 465 may be a hinge cover 465 for covering the sub door hinge 130 mounted on the cap decoration 460. In other words, because the hinge cover 465 is coupled to the cap decoration 460, the support member 560 may be supported by the hinge cover 465 and may thus be pushed forward.

Specifically, the cover 465 may be coupled to the cap decoration 460 by means of hook elements 466. At this point, the cover 465 may be provided with a protrusion or rib 467 so as to push the support member 560 forward.

Accordingly, the protrusion or rib 467 may serve to push the whole support member 560 forward and to maintain the pushed state of the support member 560. In addition, the elastic element 562 biases the holder 561 forward. As a result, the microphone module 510 may be maintained in the state of being in close contact with the front panel 471. In this embodiment, the microphone module 510 may, of course, come into close contact with the rear surface of the front panel 471 through the through hole 461.

The shape of the through hole 461 is preferably configured to mate with the shape of the holder 561. Consequently, since it is possible to prevent the holder 561 from being displaced in the through hole 461, the tight contact force of the microphone module 510 can be efficiently maintained.

The PCB of the knock sensor module 500 may be mounted on the lower surface of the cover 465. In other words, the cap decoration 460 may be provided with a space required to mount the sub door hinge 130 and the PCB. The signal line of the sensor or sensor module 500 may extend to the inside of the cabinet 10 or the main door through the through hole 131 and may be connected to the main controller 700.

Although the sensor module 500 may be mounted at any position on the marginal area of the door or the sub door, the knock sensor module 500 will be preferably mounted on the upper cap decoration in order to satisfactorily dispose the signal line.

Figure 17:
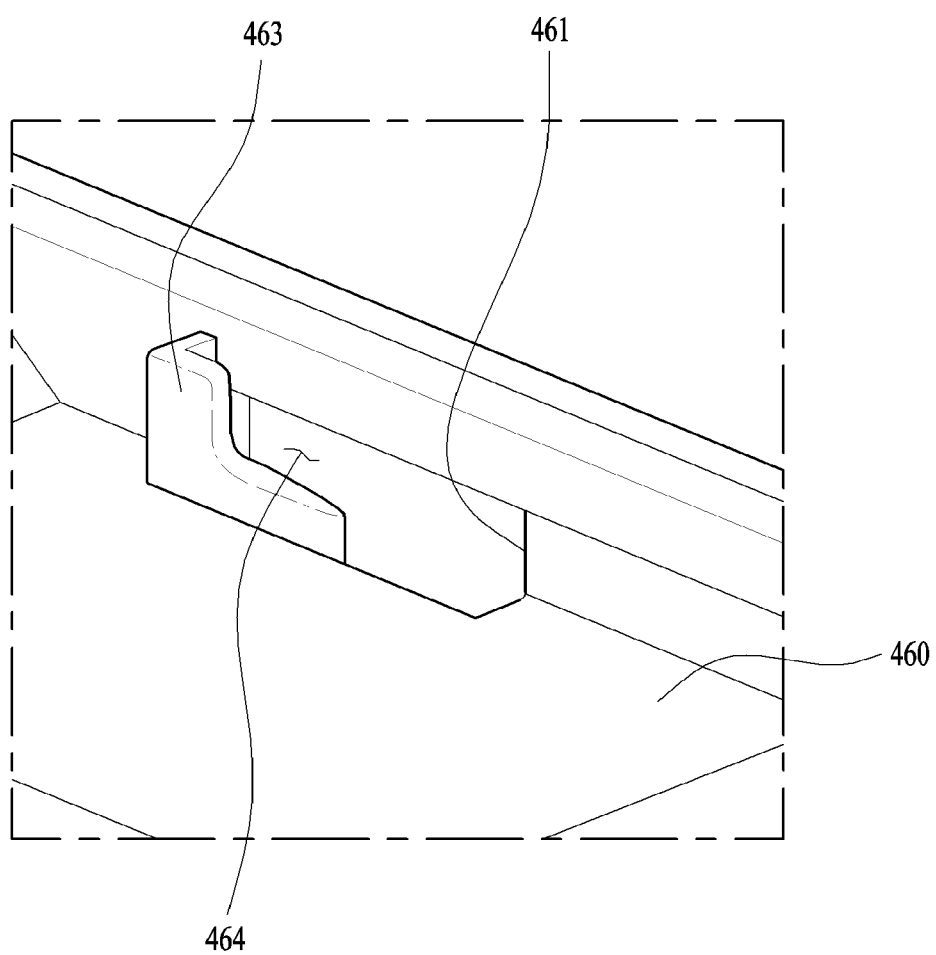
FIG. 17 is an enlarged view showing a cap decoration having a through hole formed therein in another embodiment of the structure for mounting the sensor device module (microphone module) of the sub door according to the second embodiment.
Figure 18:
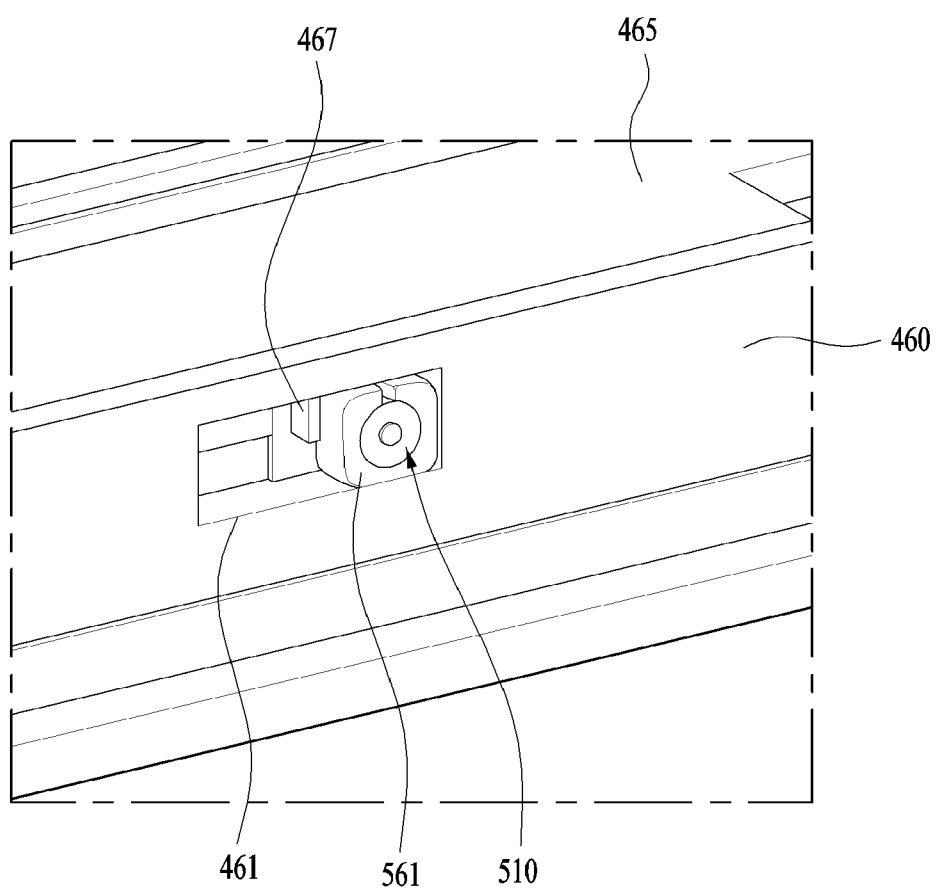
FIG. 18 is a fragmentary perspective view showing the microphone module mounted in the through hole shown in FIG. 17.
Figure 19:
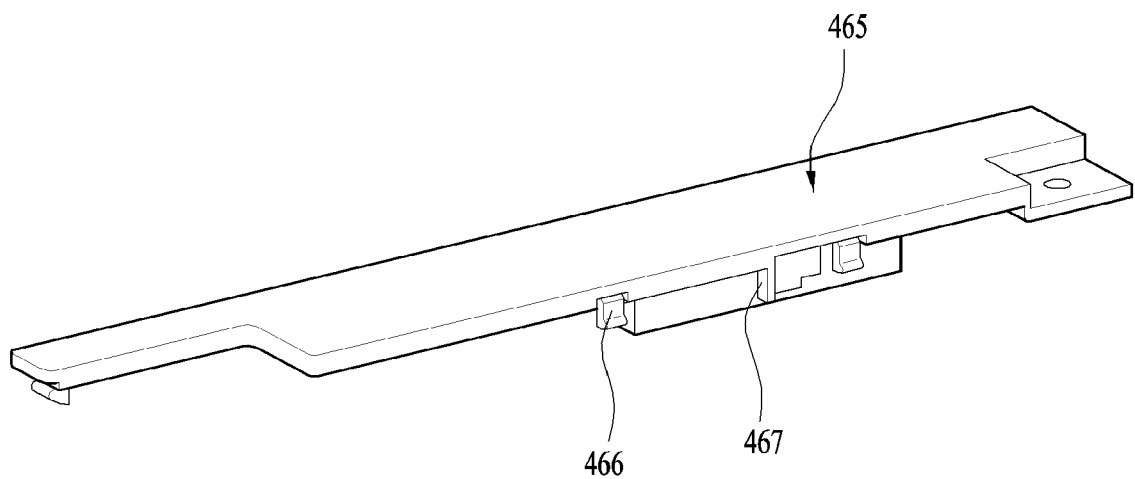
FIG. 19 is a perspective view of a cover coupled to the cap decoration shown in FIG. 17.

Hereinafter, a further embodiment of the structure for mounting the microphone module 510 will be described with reference to FIGS. 17 to 19.

As in the above embodiments, this embodiment also suggests the structure for mounting the microphone module 510 using the door frame, in particular, the cap decoration 460.

The cap decoration 460 may include a through hole 461 formed therein. The microphone module 510 may pass through the through hole 461 and may closely contact the rear surface of the front panel 471.

The microphone module 510 is received in the holder 561, which is configured to be identical or similar to that in the above embodiments. The holder 561 may constantly push the microphone module 510 toward the front panel, thus constantly causing the microphone module 510 to closely contact the front panel.

Since the holder 561 may also be made of a flexible material, the holder 561 may be flexibly restored toward the front panel in the state of being compressed.

To this end, a holder mount 463 may be provided in the rear of the through hole 461. The holder 561 may be pushed into and mounted in the holder mount 463 while containing the microphone module 510 therein. At this point, the through hole 461 may be configured to have a larger dimension than the holder 561 in the direction in which the holder is mounted. Specifically, when the holder 561 is pushed from the left side toward the right side to be mounted, as shown in FIG. 18, the through hole 461 preferably has a horizontal width greater than the horizontal width of the holder 561. Of course, the through hole 461 is preferably configured to have a vertical width corresponding to the vertical width of the holder 561 such that the upper and lower surfaces of the holder 561 are tightly fitted in the through hole 461.

Specifically, a predetermined space may be defined between the holder mount 463 and the through hole 461, and the holder 561 may be fitted in the predetermined space 464. More specifically, the width of the predetermined space in the forward and rearward direction is decreased as the holder 561 is inserted into the predetermined space. In other words, when the holder 561 is fully inserted into the space, the holder 561 is compressed forward and rearward. Accordingly, the holder 561 tends to flexibly return to its original state, thus generating a force that pushes the microphone module 510 forward.

The holder 561, which has been inserted, may be held in position. As described above, the cover 465 may be a cover for covering the cap decoration 460, or may be a hinge cover for covering the sub door hinge 130. The cover 465 may also be coupled to the cap decoration 460 by means of the hook elements 466.

The cover 465 may be provided on the lower surface thereof with a protrusion or rib 467 that protrudes downward. When the cover 465 is coupled to the cap decoration 460, the protrusion or rib 467 pushes the holder 561. In other words, the protrusion or rib 467 pushes the holder 561 in the direction in which the holder 561 is inserted into the through hole 461.

Consequently, the holder 561 may always be maintained in the compressed state in the holder mount 463, and may be securely held regardless of vibrations or movement of the door. Therefore, the microphone module 510 may closely contact the front panel 471, and the close contact state may be continuously maintained.

Figure 20:
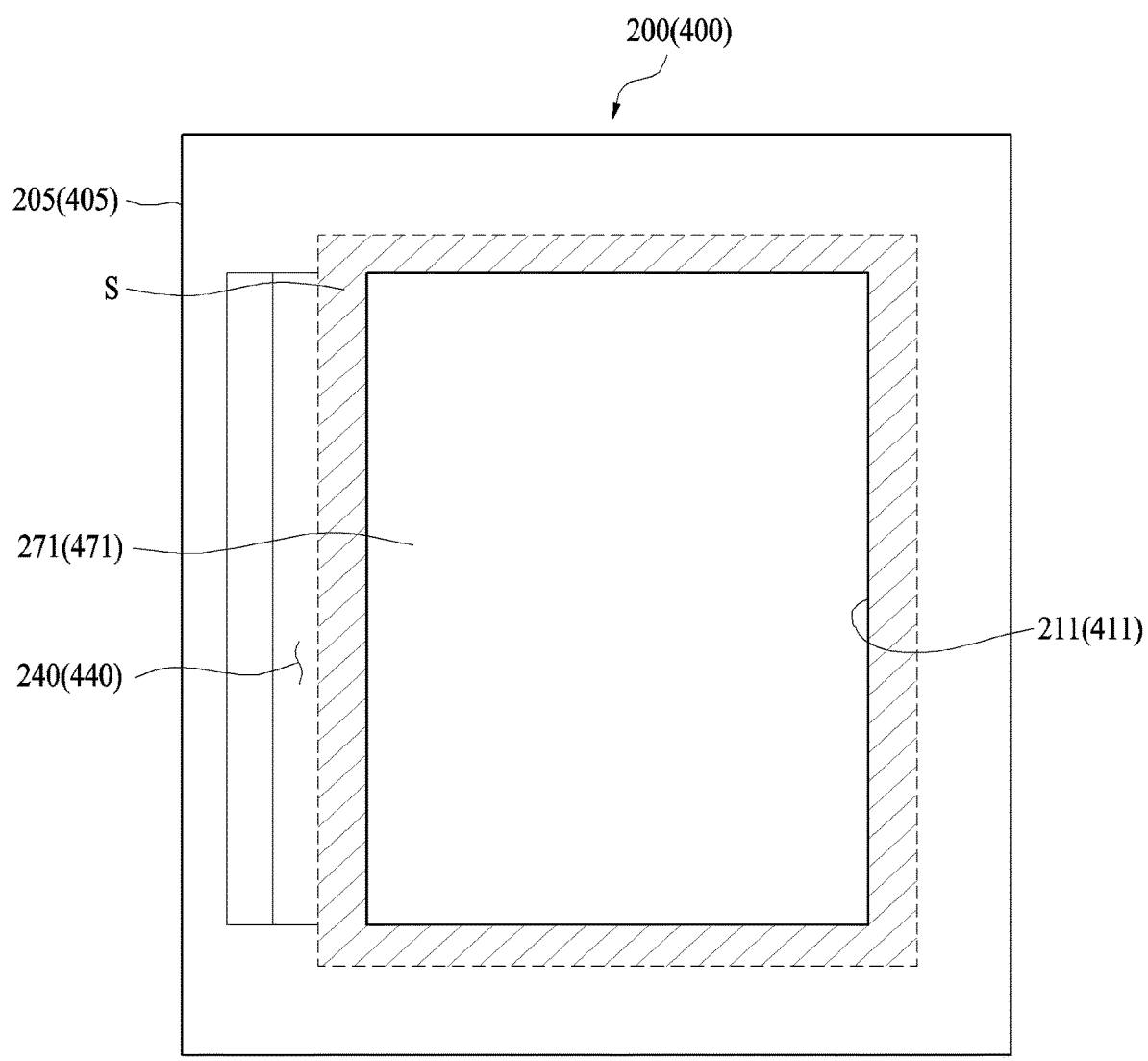
FIG. 20 a conceptual diagram illustrating the position on the sub door on which the sensor device module (microphone module) is mounted and the area on the sub door on which a user taps.

FIG. 20 is a conceptual diagram illustrating the position on the see-through door on which the microphone module is mounted and the area on the see-through door to which a user knock input is applied. In the case where the main door or the sub door is constructed to be converted into a see-through door, the door has the opening 411 for defining the see-through door. In other words, the storage compartment or the sub storage compartment becomes visible from the outside through the area radially inside the opening.

In the front surface of the door, the area inside the opening and at least part of the area outside the opening are defined by the front panel, as mentioned above. In the front surface of the outside type door, the area inside the opening and at least part of the area outside the opening are defined by the front panel, and the marginal area of the door is defined by the door frame, as mentioned above. In the inside type door, the entire front surface of the door is defined by the front panel.

Accordingly, the area to which a user knock input is applied may be basically the entire area defined by the front surface of the front panel. However, a user may unconsciously apply the knock input to the area that is converted into a see-through door. The area that is substantially converted into a see-through door is considered as the area radially inside the opening 211 or 411. Therefore, the entire rectangular area defined by the opening 211 or 411 may be defined as the area on which a user applies the knock input.

Since this knock input area is a see-through area, the microphone module is preferably mounted on an area other than the see-through area. Of course, the microphone module mounting area may be considered as an extension of the area of the front panel.

Accordingly, the mounting point of the microphone module is preferably positioned at the area radially outside the opening 211 or 411. As shown in FIG. 20, the microphone module is preferably mounted at a predetermined area S surrounding the opening 211 or 411.

Since the predetermined area S is not the see-through area, a user cannot easily see the microphone module from the front of the door even though the microphone module is in close contact with the front panel. Accordingly, the area to which the knock input can be applied may be efficiently expanded, and the distance between the knock input area and the microphone module mounting area can be sufficiently increased.

In order to sufficiently prevent the microphone module from being visibly exposed from the front surface of the door, the rear surface of the predetermined area S may be provided with a printed layer. In other words, the area of the rear surface of the front panel according to the predetermined area S may be formed with a printed layer. However, since the outside type door is constructed such that the predetermined area S is covered by the door frame or the outer door, the printed layer may be omitted.

As described above, the user input for conversion into a see-through door may be tapping on the front surface of the door, and the tapping may be detected by the sensor device, in particular, the microphone.

So many environmental factors that apply vibrations to the front surface of the door may be present. The front surface of the door may be vibrated by impacts caused by opening and closing of the door, intensive external noise, or the like. The input caused by these environmental factors may be determined to be a normal knock signal.

Accordingly, the sensor module enables a number of taps on the front surface of the door by a user to be determined as normal knock input. Specifically, the action whereby a user taps on the front surface of the door multiple times at a predetermined time intervals may be determined as normal knock input.

By way of example, the action whereby a user taps on the front surface of the door twice within a predetermined period of time may be determined as normal knock input. Considering a user's general knock pattern, it will be appreciated that the interval between the first knock and the second knock is about 600 ms or less. Since one second is 1000 ms, the action whereby the first knock and the second knock occur at an interval shorter than 1 second may be determined to be normal knock input.

Accordingly, it is possible to remarkably prevent abnormal input from being determined as a normal knock signal by setting the time interval.

The intensities of users' knocks may be different from each other. Although the difference between the intensities of users' knocks may be great, it will be appreciated that the difference between users' vibration patterns is very small. Accordingly, the difference between intensities of users' knocks may be compensated for by an algorithm, and normal knock input may be efficiently recognized based on the pattern of knock input and the time interval between knocks.

In other words, this indicates that the error whereby abnormal knock input is recognized as normal knock input may be remarkably reduced.

As described above, when the knock input is determined to be normal knock input, the controller 700 activates the lighting device 600. The controller 700 may control the lighting device to be turned off after the lapse of a predetermined period of time. When a user applies a second knock input before the predetermined period of time has elapsed, the controller 700 may control the lighting device 600 to be turned off. The knock input in this case may be the same as the knock on input. At this point, in order to distinguish such knock input from knock on input, only a single knock may be recognized as the knock off input.

It is, of course, preferable that the single knock input be recognized as the knock off input only when the single knock input occurs before the lapse of a predetermined period of time after the determination of knock on input As described above, the substantially entire front surface of the door may be used as the knock on input area by employing a sensor device such as the microphone. In other words, a wide area may be used as the knock on input area without having to provide the knock on input area with an additional sensor, such as a touch sensor or an electrostatic sensor. This means that it is possible to prevent an increase in costs attributable to the provision of a touch sensor, or an electrostatic sensor, or an additional panel including the sensor, and to improve durability. Furthermore, the door can be simply constructed.

In addition, this indicates that the knock on input can be easily applied to a wide area regardless of a user's posture or even if both hand are not free. Furthermore, the knock on input area may be defined to be substantially identical to the see-through area. Accordingly, it is possible to obviate elements that obstruct the transmission of light through the see-through area, that is, components such as a touch panel. As a result, a clearer see-through may be realized.

There may be the case where two continuous knock on inputs are applied, for example in advertently or due to children playing. While two continuous knock inputs within 600 ms of each other are determined to be normal knock input, there is a need to efficiently handle the case of three or more continuous knock inputs.

Figure 21:
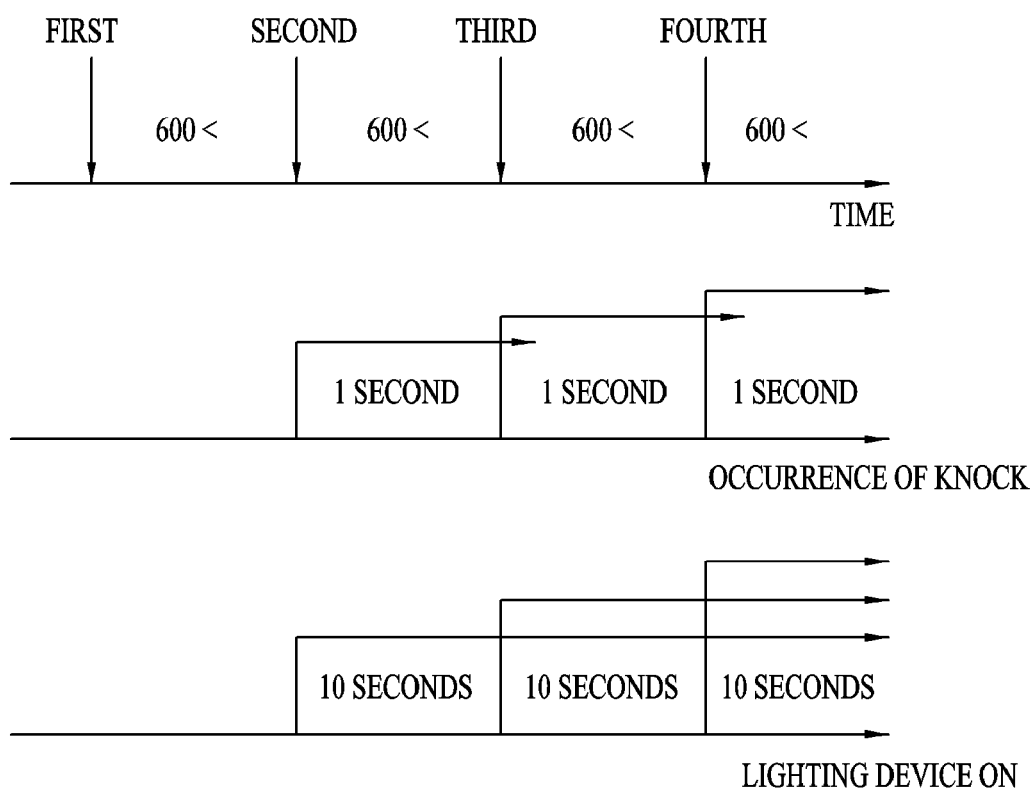
FIGS. 21 to 23 are graphs illustrating the control logic of embodiments of a control method performed in accordance with various continuous knock inputs.

FIG. 21 illustrates an example of the control method at the time of the continuous generation of knock signals.

When a second knock signal is generated within 600 ms after generation of the first knock signal, the knock input is recognized as normal knock input, thus activating the lighting device. The lighting device may be basically controlled in such a manner as to be turned on, for example, for 10 seconds at the time of application of the normal knock input.

When the normal knock input is recognized by the application of the second knock signal, the second knock signal may be recognized as a subsequent first knock signal. Accordingly, when a third knock signal is further applied within 600 ms, the second knock signal and the third knock signal may be recognized as normal knock input. Therefore, the lighting device may be controlled to be further turned on for 10 seconds after recognition of the third knock signal. In other words, when the normal knock signals are continuously recognized, the ON state of the lighting device may be controlled to be continuously extended.

Accordingly, according to this embodiment, since the two normal knock inputs are recognized as the normal knock input signal, the reliability of knock input may be ensured. However, when two continuous normal knock inputs are applied due to a user playing, there may be the possibility that the lighting device is unnecessarily activated.

Figure 22:
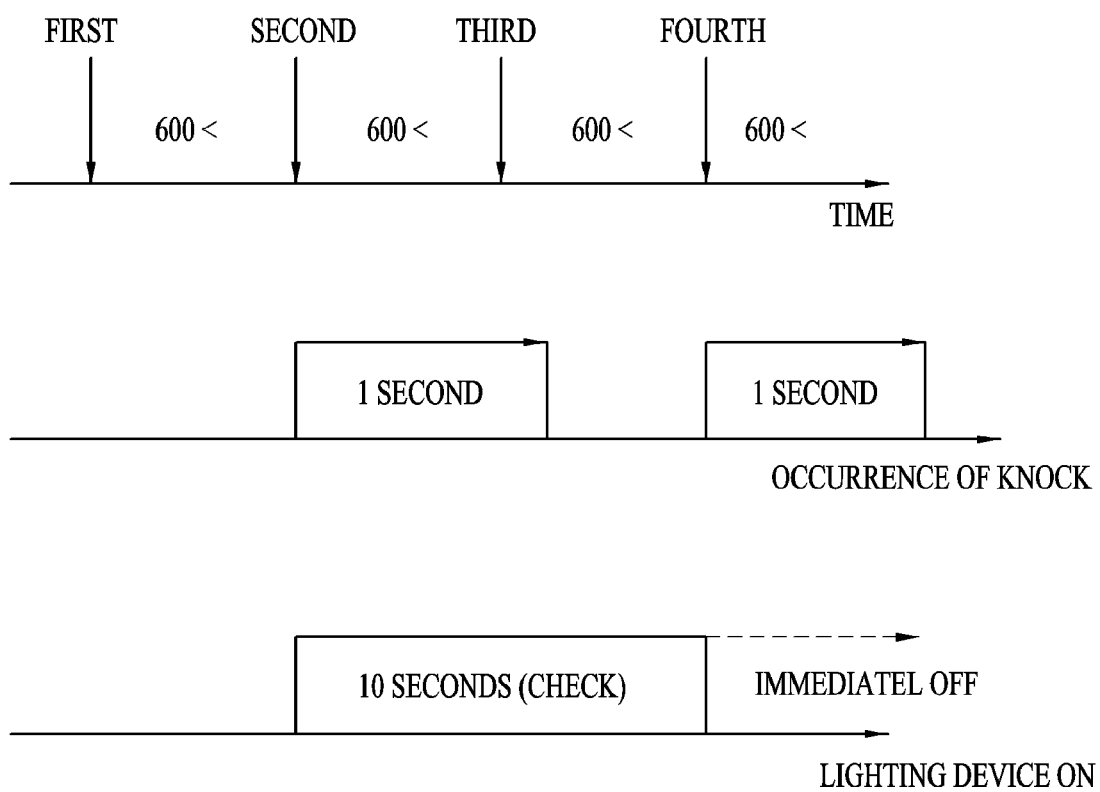

FIG. 22 illustrates another example of the control method at the time of the continuous generation of knock signals.

When the second knock signal is generated within 600 ms after generation of the first knock signal, the knock input is recognized as normal knock input, thus activating the lighting device. The lighting device may be basically controlled in such a manner as to be turned on, for example, for 10 seconds at the time of application of the normal knock input.

When the normal knock input is recognized by the second knock signal, the time interval between the second knock signal and the third knock signal is determined. For example, when the third knock signal is applied after a time interval of 600 ms, this may be recognized as a normal knock off signal. In other words, when the third knock signal is applied after a time interval of 600 ms since the lighting device was turned on by the second knock signal, this may be recognized as normal knock off input. However, when a third knock signal is applied within a time interval of 600 ms, the third knock signal may be ignored.

When the third knock signal is applied within the time interval of 600 ms and the fourth knock signal is further applied within the time interval of 600 ms, the fourth knock signal may be recognized as knock off input. Accordingly, the lighting device may be controlled to be turned off when the fourth knock signal is recognized. When the fifth knock signal is applied within a time interval of 600 ms after the application of the fourth knock signal, the fifth knock signal and the sixth knock signal may be recognized as normal knock on input, thus activating the lighting device again.

Accordingly, according to this embodiment, when the normal knock inputs are repeatedly applied, the lighting device may be controlled to be repeatedly turned on and off. Thanks to this control method, it is possible to reduce the time during which the lighting device is continuously turned on compared to the previous embodiment.

Figure 23:
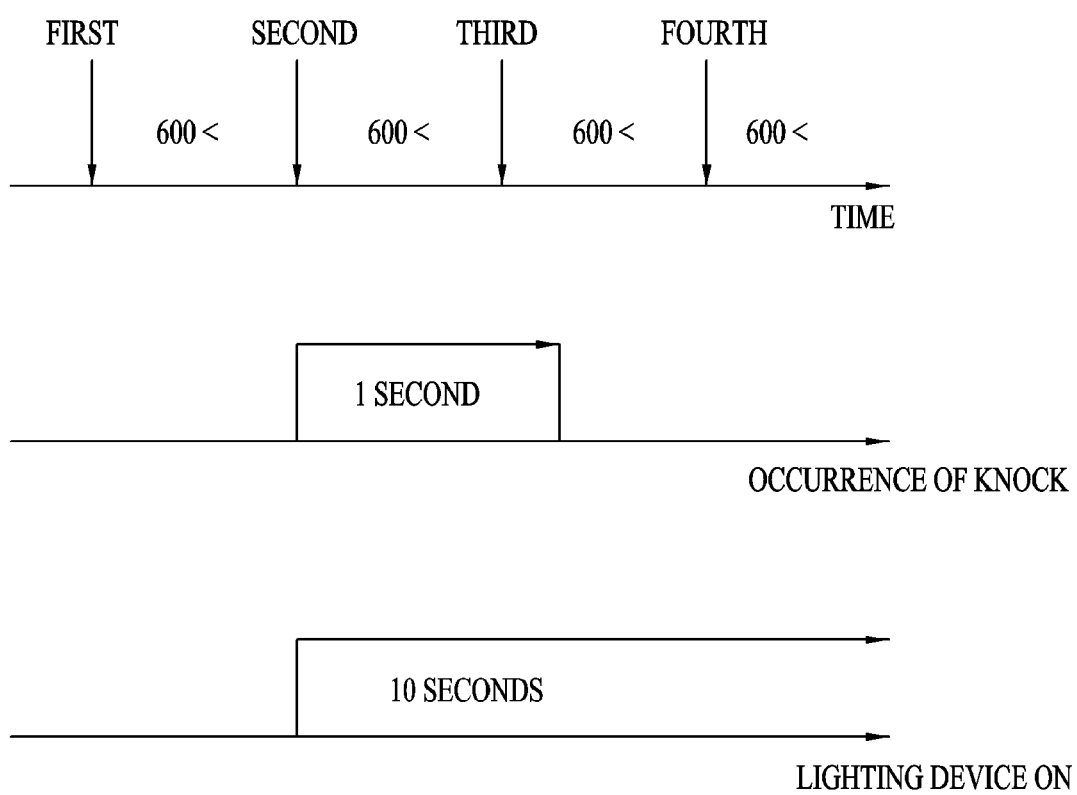

FIG. 23 illustrates a further example of the control method at the time of the continuous generation of knock signals.

According to this embodiment, when knock inputs are repeatedly applied at time intervals equal to or less than 600 ms, only the first two knock inputs are recognized as normal knock inputs. In other words, the lighting device is turned on for 10 seconds by the two normal knock inputs, and knock input signals which are applied while the lighting device is turned on may be ignored.

According to this embodiment, it is possible to prevent the lighting device from being activated for a longer time than necessary and to prevent the lighting device from being repeatedly turned on and off when not necessary. However, since this case does not need knock off input, the lighting device may be maintained in the state of being turned on for a predetermined time when the lighting device is turned on. Accordingly, for example, in the case of a series of actions whereby a user performs knock on input, opens the door to take out a desired object, and then closes the door within, for example, 5 seconds, a problem whereby the lighting device is activated for a longer time than necessary may occur.

Nevertheless, this embodiment is able to control the lighting device in a very simple and easy manner even when knock on input is repeatedly applied, and is able to prevent the deterioration of durability due to frequently turning on and off the lighting device.

MODE FOR INVENTION

Various embodiments have been described in the best mode for carrying out the invention.

INDUSTRIAL APPLICABILITY

The present invention provides a refrigerator equipped with a door for opening and closing a storage compartment, which is at least partially transparent so as to make the interior of the storage compartment visible without having to open the door.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A refrigerator comprising:
   a cabinet having a storage chamber defined therein and the storage chamber having a rear wall;
   a door coupled to the cabinet and configured to open and close at least a portion of the storage chamber, the door comprising:
      a frame having an opening; and
      a panel assembly configured to cover the opening of the frame, the panel assembly comprising:
         a first panel configured to allow passage of light;
         a second panel configured to allow passage of light, the second panel arranged behind the first panel such that the second panel is closer to the rear wall of the storage chamber than the first panel;
         a seal provided between the first panel and the second panel such that an insulation space is provided between the first panel and the second panel; and
         a first spacer disposed in the insulation space between the first panel and the second panel,
   a lighting device provided in the storage chamber; and
   a controller configured to control the lighting device to be turned on and off, wherein
   a thickness of the first spacer in a first direction parallel to an arrangement direction of the first and second panel is less than a thickness of each of the first and second panels in the first direction, and
   a width of the first spacer in a second direction perpendicular to the first direction is less than a width of the seal in the second direction, and
   wherein when the lighting device is turned on by the controller, the storage chamber is viewable through the first and second panels when the door is closed.

2. The refrigerator of claim 1, wherein the panel assembly further comprises a hole provided in the first panel or the second panel.

3. The refrigerator of claim 2, wherein the hole extends to the insulation space, and wherein the panel assembly further comprises a plug configured to block the hole.

4. The refrigerator of claim 3, wherein the panel assembly further comprises a frit glass on the plug to seal the hole.

5. The refrigerator of claim 4, wherein the frit glass is configured to protrude from a surface of one of the first panel and the second panel.

6. The refrigerator of claim 1, wherein the seal is provided at a perimeter of the panel assembly.

7. The refrigerator of claim 1, wherein a thickness of the seal in the first direction is less than a thickness of each of the first and second panels in the first direction.

8. The refrigerator of claim 1, wherein the panel assembly further comprises a front panel arranged in front of the first panel, the front panel configured to allow passage of light.

9. The refrigerator of claim 8, wherein the panel assembly further comprises a second spacer disposed between the front panel and the first panel, and wherein a distance between the front panel and the first panel is greater than a distance between the first panel and the second panel.

10. The refrigerator of claim 9, wherein the door further comprises a sensor provided behind the front panel, and wherein the controller controls the lighting device to be turned on in response to a an input sensed by the sensor.

11. The refrigerator of claim 1, wherein the spacer is made of stainless steel, glass, or plastic.

12. The refrigerator of claim 1, wherein the seal is made of glass.

13. The refrigerator of claim 1, wherein the insulation space is in a vacuum state.

14. A refrigerator comprising:
a cabinet having a storage chamber defined therein and the storage chamber having a rear wall;
a first door coupled to the cabinet and configured to open and close at least a portion of the storage chamber, the first door having a first opening; and
a second door configured to be rotatable with respect to the first door and configured to cover the first opening, the second door comprising:
a frame having a second opening; and
a panel assembly configured to cover the second opening; the panel assembly comprising:
a first panel configured to allow passage of light;
a second panel configured to allow passage of light, the second panel arranged behind the first panel such that the second panel is closer to the rear wall of the storage chamber than the first panel;
a seal provided between the first panel and the second panel such that an insulation space is provided between the first panel and the second panel; and
a first spacer disposed in the insulation space between the first panel and the second panel,
a lighting device provided in the storage chamber or the first opening of the first door; and
a controller configured to control the lighting device to be turned on and off, wherein
a thickness of the first spacer in a first direction parallel to an arrangement direction of the first and second panels is less than a thickness of each of the first and second panels, and
a width of the spacer in a second direction perpendicular to the first direction is less than a width of the seal in the second direction,
wherein when the lighting device is turned on by the controller, the storage chamber is viewable through the first and second panels when the second door is closed.

15. The refrigerator of claim 14, wherein the panel assembly further comprises a hole provided in the first panel or the second panel.

16. The refrigerator of claim 15, wherein the hole extends to the insulation space, and wherein the panel assembly further comprises a plug configured to block the hole.

17. The refrigerator of claim 16, wherein the panel assembly further comprises a frit glass on the plug to seal the hole.

18. The refrigerator of claim 14, wherein the seal is provided at a perimeter of the panel assembly.

19. The refrigerator of claim 14, wherein a thickness of the seal in the first direction is less than a thickness of each of the first and second panels in the first direction.

20. The refrigerator of claim 14, wherein the panel assembly further comprises a front panel arranged in front of the first panel, the front panel configured to allow passage of light.

21. The refrigerator of claim 20, wherein the panel assembly further comprises a second spacer disposed between the front panel and the first panel, and wherein a distance between the front panel and the first panel is greater than a distance between the first panel and the second panel.

22. The refrigerator of claim 14, wherein the insulation space is in a vacuum state.

* * * * *